(12) United States Patent
Evans et al.

(10) Patent No.: US 8,533,597 B2
(45) Date of Patent: Sep. 10, 2013

(54) STRATEGIES FOR CONFIGURING MEDIA PROCESSING FUNCTIONALITY USING A HIERARCHICAL ORDERING OF CONTROL PARAMETERS

(75) Inventors: Glenn F. Evans, Kirkland, WA (US); Bruce W. Randall, Corte Madera, CA (US); Stacey L. Spears, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1937 days.

(21) Appl. No.: 11/172,251

(22) Filed: Jun. 30, 2005

(65) Prior Publication Data

US 2005/0273791 A1 Dec. 8, 2005

Related U.S. Application Data

(63) Continuation-in-part of application No. 10/676,722, filed on Sep. 30, 2003, now Pat. No. 7,552,450.

(51) Int. Cl.
*G06F 3/00* (2006.01)
*G06F 3/01* (2006.01)

(52) U.S. Cl.
USPC ........... 715/717; 715/716; 715/718; 715/719; 715/722

(58) Field of Classification Search
USPC ................ 715/523, 716, 717, 718, 719, 722; 725/87, 112; 709/232
See application file for complete search history.

(56) References Cited

U.S. PATENT DOCUMENTS

| | | | |
|---|---|---|---|
| 5,687,367 A | 11/1997 | Dockter et al. | |
| 5,903,652 A | 5/1999 | Mital | |
| 5,983,190 A | 11/1999 | Trower, II et al. | |
| 6,020,931 A * | 2/2000 | Bilbrey et al. | 348/584 |
| 6,044,408 A | 3/2000 | Engstrom et al. | |
| 6,059,838 A | 5/2000 | Fraley et al. | |
| 6,078,743 A | 6/2000 | Apte et al. | |
| 6,101,510 A | 8/2000 | Stone et al. | |
| 6,121,981 A | 9/2000 | Trower, II et al. | |
| 6,182,109 B1 | 1/2001 | Sharma et al. | |
| 6,185,625 B1 | 2/2001 | Tso et al. | |
| 6,256,772 B1 | 7/2001 | Apte et al. | |

(Continued)

OTHER PUBLICATIONS

"IEncoderAPI Interface," MSDN library, provided by Microsoft Corporation of Redmond, WA, available at <<http://msdn.microsoft.com/library/default.asp?url=/library/en-us/directshow/htm/iencoderapiinterface.asp>>, accessed on Nov. 9, 2005, 2 pages.

(Continued)

*Primary Examiner* — Nicholas Augustine
(74) *Attorney, Agent, or Firm* — Lee & Hayes, PLLC

(57) ABSTRACT

Strategies for effectively discovering, selecting, configuring, and controlling components used in media processing applications are described. According to one exemplary implementation, the strategies described configure the components based on profile information, configuration information, and a hierarchical ordering of configuration parameters. The hierarchical ordering may combine different coding paradigms, where one or more high level nodes in the ordering may define configuration parameters which are common to multiple coding paradigms. In this ordering, selection of a configuration parameter may cascade down to affect lower-ranking dependent parameters in the hierarchical ordering. According to one advantage, the hierarchical ordering provides a more uniform, extensible, and problem-free approach to configuring components than unstructured approaches to configuration. Moreover, applications can utilize the hierarchical ordering at different levels of granularity.

20 Claims, 8 Drawing Sheets

(56) References Cited

U.S. PATENT DOCUMENTS

| | | |
|---|---|---|
| 6,263,492 B1 | 7/2001 | Fraley et al. |
| 6,279,030 B1 | 8/2001 | Britton et al. |
| 6,289,390 B1 | 9/2001 | Kavner |
| 6,289,395 B1 | 9/2001 | Apte et al. |
| 6,295,556 B1 | 9/2001 | Falcon et al. |
| 6,327,608 B1 | 12/2001 | Dillingham |
| 6,369,821 B2 | 4/2002 | Merrill et al. |
| 6,381,734 B1 | 4/2002 | Golde et al. |
| 6,393,456 B1 | 5/2002 | Ambler et al. |
| 6,401,099 B1 | 6/2002 | Koppolu et al. |
| 6,434,740 B1 | 8/2002 | Monday et al. |
| 6,460,029 B1 | 10/2002 | Fries et al. |
| 6,470,378 B1 | 10/2002 | Tracton et al. |
| 6,484,259 B1 | 11/2002 | Barlow |
| 6,513,031 B1 | 1/2003 | Fries et al. |
| 6,519,605 B1 | 2/2003 | Gilgen et al. |
| 6,535,110 B1 | 3/2003 | Arora et al. |
| 6,542,908 B1 | 4/2003 | Ims |
| 6,564,270 B1 | 5/2003 | Andert et al. |
| 6,581,102 B1 | 6/2003 | Amini et al. |
| 6,594,699 B1 | 7/2003 | Sahai et al. |
| 6,603,476 B1 | 8/2003 | Paolini et al. |
| 6,604,196 B1 | 8/2003 | Monday et al. |
| 6,606,642 B2 | 8/2003 | Ambler et al. |
| 2002/0065952 A1 | 5/2002 | Sullivan et al. |
| 2002/0075290 A1 | 6/2002 | Rajarajan et al. |
| 2002/0087950 A1 | 7/2002 | Brodeur et al. |
| 2002/0099876 A1 | 7/2002 | Bui et al. |
| 2002/0112058 A1 | 8/2002 | Weisman et al. |
| 2002/0116248 A1 | 8/2002 | Amit et al. |
| 2002/0176366 A1 | 11/2002 | Ayyagari et al. |
| 2002/0188941 A1 | 12/2002 | Cicciarelli et al. |
| 2003/0004771 A1 | 1/2003 | Yaung |
| 2003/0005110 A1 | 1/2003 | Corbin et al. |
| 2003/0009553 A1 | 1/2003 | Benfield et al. |
| 2003/0018964 A1 | 1/2003 | Fox et al. |
| 2003/0023472 A1 | 1/2003 | Lee et al. |
| 2003/0023662 A1 | 1/2003 | Yaung |
| 2003/0023728 A1 | 1/2003 | Yaung |
| 2003/0023773 A1 | 1/2003 | Lee et al. |
| 2003/0028550 A1 | 2/2003 | Lee et al. |
| 2003/0037327 A1 | 2/2003 | Cicciarelli et al. |
| 2003/0037328 A1 | 2/2003 | Cicciarelli et al. |
| 2003/0055948 A1 | 3/2003 | Wang |
| 2003/0097458 A1 | 5/2003 | Bourges-Sevenier |
| 2003/0101190 A1 | 5/2003 | Horvitz et al. |
| 2003/0106041 A1* | 6/2003 | Stone et al. .................. 717/108 |
| 2003/0159105 A1* | 8/2003 | Hiebert ........................ 715/500 |
| 2003/0229900 A1* | 12/2003 | Reisman ........................ 725/87 |
| 2004/0031058 A1* | 2/2004 | Reisman ....................... 725/112 |
| 2004/0204073 A1 | 10/2004 | Yanosy |
| 2005/0278270 A1* | 12/2005 | Carr et al. ........................ 706/25 |
| 2006/0031763 A1* | 2/2006 | Yeung ............................ 715/523 |
| 2006/0123053 A1* | 6/2006 | Scannell, Jr. ............... 707/104.1 |
| 2007/0005795 A1* | 1/2007 | Gonzalez ...................... 709/232 |

OTHER PUBLICATIONS

NVIDIA homepage, provided by NVIDIA Corporation of Santa Clara, CA, available at <<http://www.nvidia.com/page/home>>, accessed on Nov. 9, 2005, 2 pages.

CyberLink homepage, provided by CyberLink Corp. of Hsin-Tien City Taipei Hsien, Taiwan, R.O.C., available at <<http://www.cyberlink.com/>>, accessed on Nov. 9, 2005, 2 pages.

Sonic Solutions homepage, provided by Sonic Solutions, of Santa Clara, CA, available at <<http://www.sonic.com/about/defaultaspx>>, accessed on Nov. 9, 2005, 2 pages.

U.S. Appl. No. 10/676,722, entitled "Systems and Methods for Interfacing Media Components," filed Sep. 30, 2003, naming the inventors of Glenn F. Evans, William R. Messmer, and Matthijs A. Gates.

* cited by examiner

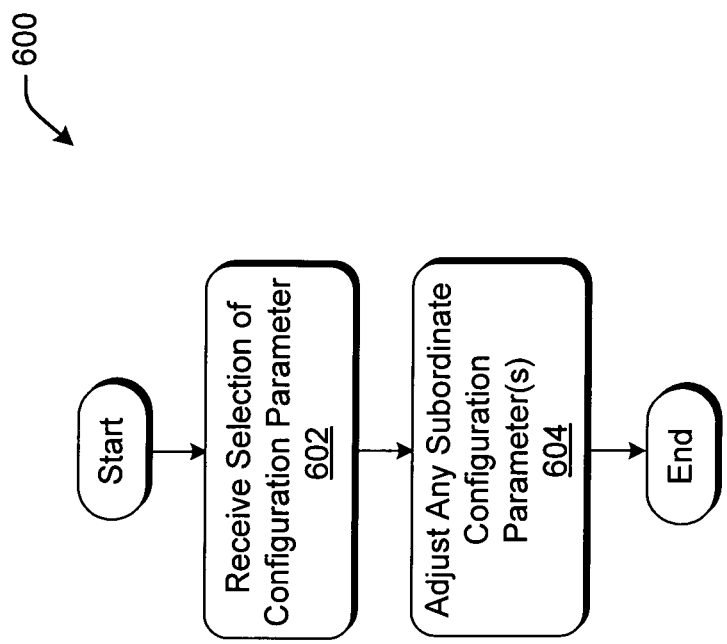

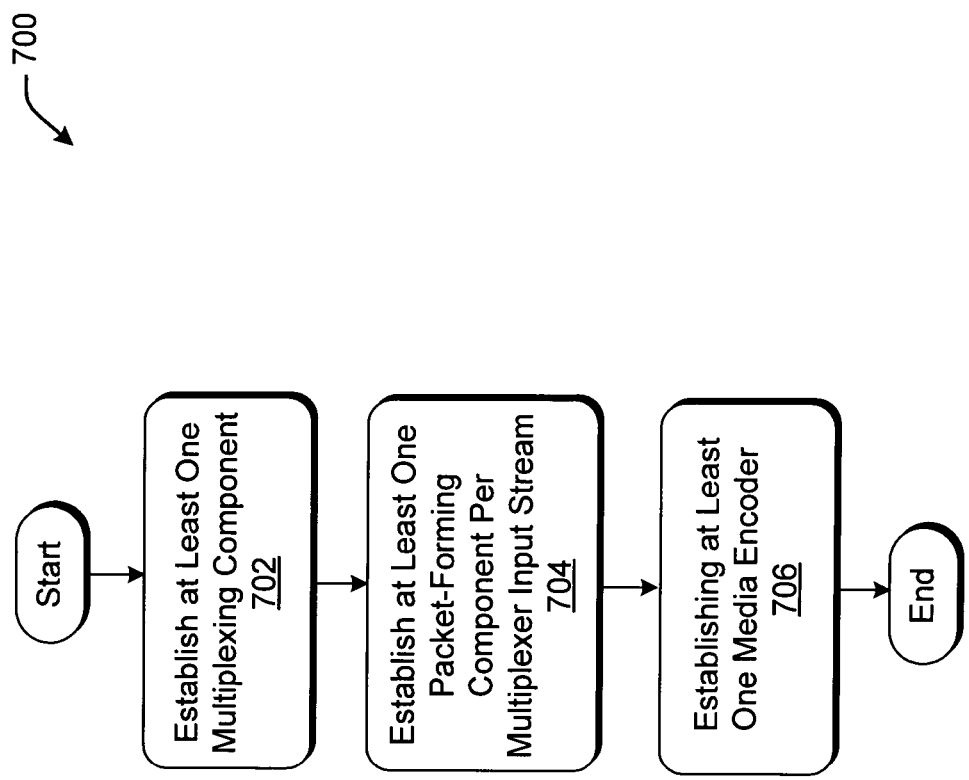

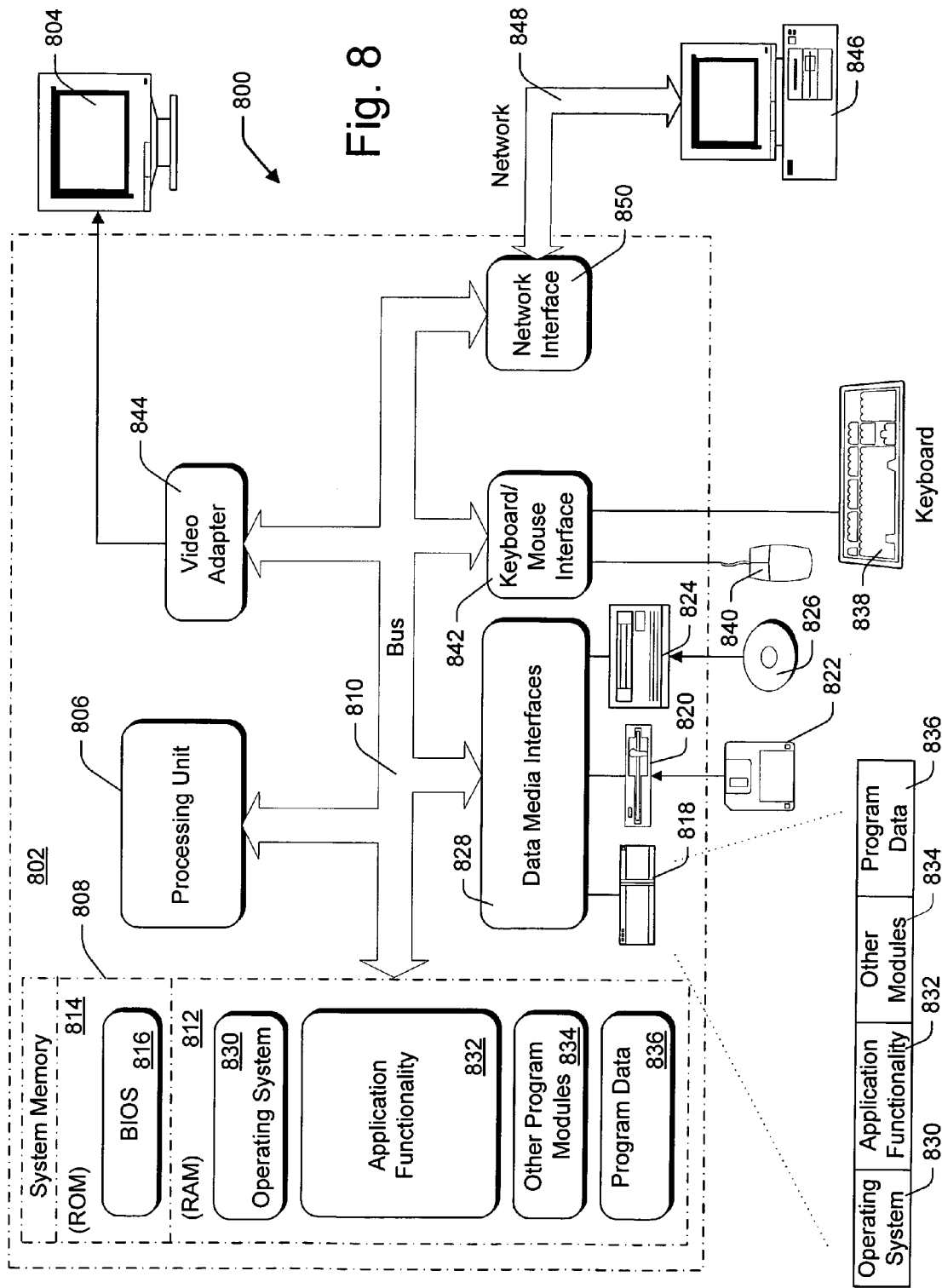

STRATEGIES FOR CONFIGURING MEDIA PROCESSING FUNCTIONALITY USING A HIERARCHICAL ORDERING OF CONTROL PARAMETERS

REFERENCE TO COPENDING APPLICATIONS

This application is a continuation-in-part of co-pending U.S. patent application Ser. No. 10/676,722 (the '722 application), entitled "Systems and Methods for Interfacing Media Components," filed on Sep. 30, 2003, and naming Glenn F. Evans et al. as inventors. The '722 application is incorporated herein by reference in its entirety.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Media processing applications sometimes incorporate third party components. For example, a principal application may perform a high-level media processing task (such as DVD authoring), and the high-level task may, in turn, rely on one or more third party components to perform basic operations encompassed by the task (such as compressing, packetizing, multiplexing, and so on). An application may adopt this implementation strategy for various reasons. For example, an application designer may wish to reduce the cost of the application by relying on existing third-party components. Or an application designer may wish to rely on third party components (rather than building such functionality into the application itself) for license-related reasons.

The task of selecting and configuring third party components may raise a number of challenges. First, an application may have complex requirements. The pool of available components may have equally complex capabilities. It is a difficult task to match the requirements of an application with the capabilities of the components. Second, it is a difficult task to ensure that the selected third party components work well together to achieve a desired end result. That is, one third party component may have a set of features (and configuration states) which conflict with the features (and configuration states) of one or more other third party components. Such conflicts can produce a configuration having an inconsistent state, which may cause the combination of components to perform in a suboptimal manner. Or such conflict may completely disable the combination of components. Third, it is difficult to modify third party components to provide enhancements and extensions to existing configurations, while still ensuring that these components consistently work with applications which may be unaware of such extensions.

The above challenges can be addressed in an ad hoc manner by a designing a custom configuration solution for each application. But this approach is problematic. For instance, to avoid configuration problems, this approach may require the application designer to have intimate familiarity with the media processing requirements, of the application, the capabilities of different components, and the manner in which different components interact. This approach may also require the designer to have expert knowledge of complex algorithms used by different multimedia compression storage formats. Further, this approach may also require the end-user to have advanced knowledge of media processing options in order to properly interact with the application, that is, by inputting configuration parameters into the user interface presentations provided by the application. Any misstep by the application designer or the end-user may produce an inconsistent state in the selected combination of components, possibly rendering the application non-functional. For example, as appreciated by the present inventors, the order in which configuration parameters are set is important; if the parameters are not set in an appropriate order, then the combination of components may be placed in an inconsistent state.

Moreover, the ad hoc approach is generally not extensible, meaning that it cannot be easily modified to suit variations in the application environment or the pool of available components. For instance, any modification to the configuration settings may require difficult analysis and significant design modification to ensure that the changes do not produce an inconsistent state. Again, this task may require expert knowledge in media processing arts.

According to another challenge, the application designer may attempt to design media processing functionality that supports a wide variety of media storage formats. An application designer may address this objective by creating a complex abstraction software layer that makes different formats appear "similar" for user interface and configuration purposes. But this is a difficult task that adds complexity and cost to the media processing functionality. Such a cumbersome abstraction layer may also provide poor extensibility with respect to future modifications made to the application, components, media formats, and so forth.

There is therefore an exemplary need for more satisfactory solutions for discovering, selecting, configuring, and controlling components used in media processing applications.

SUMMARY

This description sets forth strategies for more effectively discovering, selecting, configuring, and controlling components used in media processing applications. According to one exemplary implementation, the strategies configure the components based on profile information, configuration information, and a hierarchical ordering of configuration parameters. The hierarchical ordering may combine different coding paradigms. For example, in one exemplary hierarchical ordering, a top-most node defines configuration parameters that apply to any component used in a combination of components (such as any video encoder, audio encoder, multiplexer, etc.), regardless of coding paradigm. A second level of the ordering may contain a node that defines configuration parameters that apply to any video encoder (regardless of coding paradigm), another node that defines configuration parameters that apply to any audio encoder (regardless of coding paradigm), another node that defines configuration parameters that apply to any packetizer/multiplexer (regardless of coding paradigm), and so forth. Still other subordinate layers in the hierarchical ordering may contain nodes associated with specific video encoder coding paradigms, audio encoders coding paradigms, and multiplexer coding paradigms, and so forth. In this ordering, the selection of a configuration parameter may cascade down to affect lower-ranking dependent parameters in the hierarchical ordering.

According to another feature, the components can be combined in a defined order, wherein at least one downstream component is established prior to at least one upstream component.

The above approach has several benefits. According to one exemplary benefit, the hierarchical ordering, in conjunction with the use of profile information and configuration information, provides a uniform approach to discovering, selecting, configuring, and controlling media components. This approach eases the analysis burden in configuring components because it provides a well-defined and consistent approach to selecting and configuring components. The approach also reduces the potential that a user (or an automated mechanism) will select and configure a combination of components that will produce an inconsistent state.

Further, the approach offers improved versatility and extensibility over ad hoc approaches. As to versatility, different applications can utilize the hierarchical ordering at different levels of granularity and configuration complexity and generality. For instance, a first application may rely on the hierarchical ordering to configure a collection of components at a relatively low level of granularity, setting only very general-level configuration parameters. In this first application, a variety of different coding paradigms can be applied to satisfy the application's requirements. On the other hand, a second application may rely on the hierarchical ordering to configure a collection of components at a relatively high level of granularity, that is, by setting relatively detailed configuration parameters (such as parameters that pertain to a specific coding paradigm). In this second application, the parameters may specifically target one or more coding paradigms. In either case, the applications can be configured to supply user interface presentations to the users which solicit only those fields of information that are relevant to configuring, and controlling the applications. This feature helps reduce the complexity of the user interface presentations and improves the experience of the users when interacting with the applications.

As to extensibility, the approach accommodates the introduction of new parameters. That is, the approach allows new parameters to be integrated into the hierarchical ordering without requiring modification of the basic organization of the ordering itself.

Additional exemplary implementations and associated benefits are described in the following. It should be noted that the features described in this Summary section are intended to convey exemplary aspects of the subject matter described herein, and are not intended to limit the scope of the subject matter described in the claim section.

BRIEF DESCRIPTION OF THE DRAWINGS

FIG. 6 shows a procedure which explains an exemplary manner in which one layer 12 in the hierarchical ordering (of FIGS. 4 and 5) can potentially affect subordinate layers in the hierarchical ordering.

FIG. 7 shows an exemplary procedure for establishing components in a defined exemplary order.

FIG. 8 shows an exemplary computer environment for implementing the system of FIG. 1.

Figure 1:
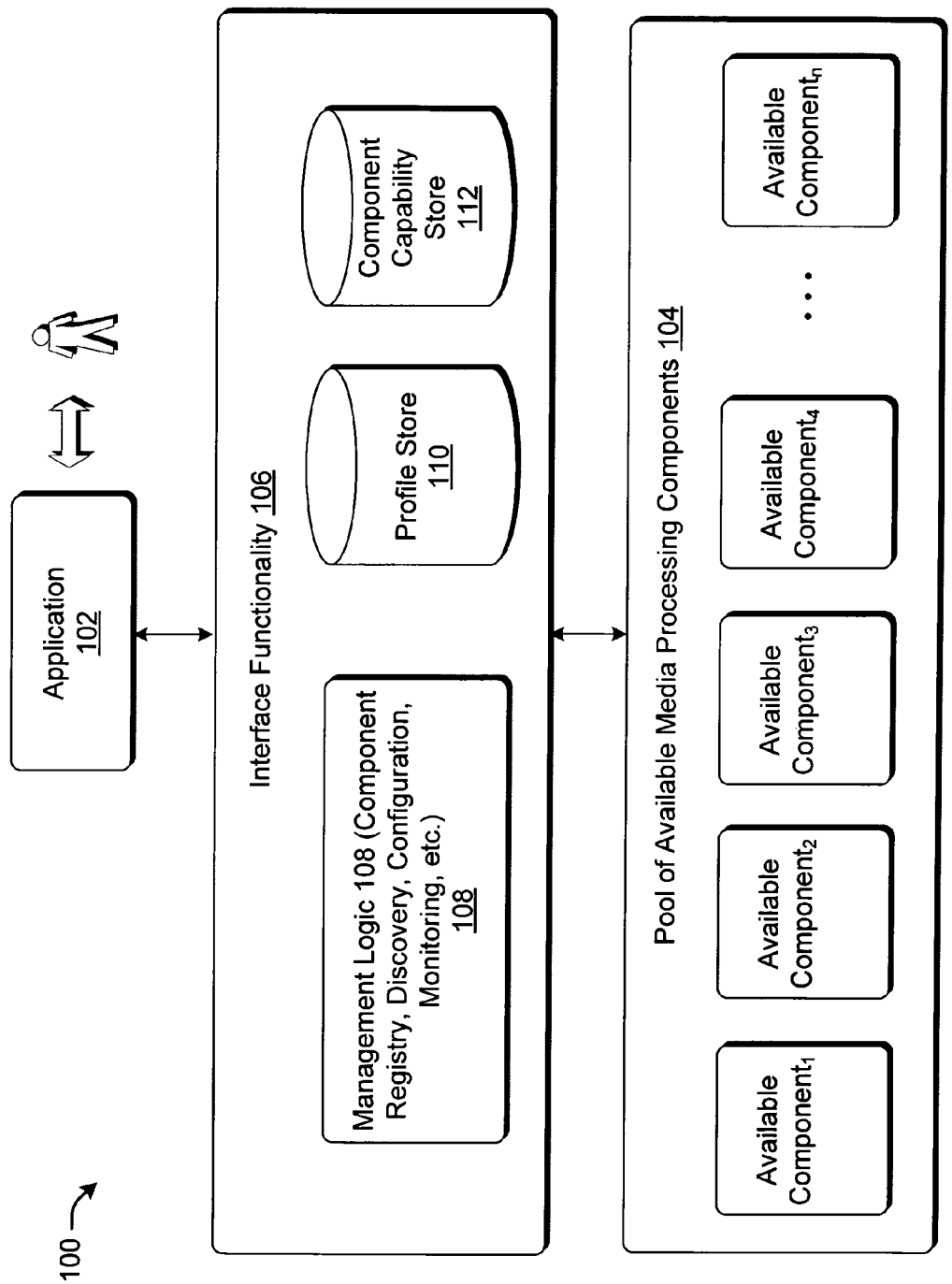
FIG. 1 shows an overview of a system for discovering, selecting, configuring, and controlling a collection of components for use in a media processing application.

The same numbers are used throughout the disclosure and figures to reference like components and features. Series 100 numbers refer to features originally found in FIG. 1, series 200 numbers refer to features originally found in FIG. 2, series 300 numbers refer 22 to features originally found in FIG. 3, and so on.

DETAILED DESCRIPTION

This description sets forth exemplary strategies for discovering, selecting, configuring, and controlling components for use in a media processing application.

As to terminology, the term "component" refers to any unit designed to process information. A component can be implemented as a hardware unit, software unit, or a unit that comprises a combination of hardware and software. A component may comprise a single "part," such as a single piece of hardware and/or software that is purchasable as a unit, or it can comprise a combination of multiple such parts. In one case, a component can be provided by a third party provider (meaning that the entity which supplies the main media processing application is different than the entity which provides the component). In another case, the component can be supplied by the same entity that provides the main media processing application.

The term "media information" refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television media programs, movies, etc.), and so on.

The term "media processing application" refers to an application for processing media information to achieve any end result. One example of a media processing application is a DVD authoring application.

The term "component module" refers to a group of one or more components that are used in a media processing application. For example, a codec grouping which combines encoders, packetizers and a multiplexer is one example of a component module.

The term "coding paradigm" refers very broadly to a set of rules that apply to the interpretation, creation and control of data. For a particular paradigm, the rules may be promulgated by a standards organization, by a commercial entity, or some other source. For example, MPEG (Moving Picture Experts Group) (e.g., MPEG2 or ISO/IEC 13818) defines one coding paradigm. SMPTE VC1 (Society of Motion Picture Television Engineers, standard VC1) (also referred to as WMV or Windows Media Video) defines another coding paradigm, and so forth.

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

This disclosure includes the following sections.

Section A presents an overview of an exemplary system for creating a combination of components (a "configuration module") for use in a media processing application. Section A also sets forth an exemplary manner of operation of the system.

Section B describes one exemplary component module that can be created using the system of Section A.

Section C describes an exemplary hierarchical organization of configuration parameters that can be used to create the component module of section B.

Section D describes an exemplary computer environment for implementing aspects of the system of Section A.

Section E constitutes a first appendix (which forms an integral part of this disclosure), setting forth an exemplary collection of configuration parameters that can be used to populate the hierarchical ordering of control parameters described in Section C.

Section F constitutes a second appendix (which forms an integral part of this disclosure), setting forth an exemplary program listing of a codecapi.h module that can be used to implement aspects of the configuration strategies.

A. Overview of Exemplary System and its Manner of Operation

FIG. 1 shows an overview of a system 100 for discovering, selecting, configuring, and controlling a collection of components for use in a media processing application. Certain features of this system 100 were set forth in the above-identified co-pending patent application Ser. No. 10/676,722 (the '722 application). It should be noted that, although the strategies described herein for configuring components (which rely on a hierarchical ordering of parameters) can be implemented using the framework set forth in the '722 application, these strategies are not limited to that framework.

The system 100 includes a media processing application 102 (or just "application" for brevity) for performing a media processing operation (such as DVD authoring, etc.). To perform its function, the application 102 may rely on a collection of components drawn from a pool of available components 104. As previously described, the components 104 can represent hardware units, software units, hybrid units implemented in both hardware and software, and so forth. The components 104 can be provided by the same entity which provides the application 102, or by a different ("third party") entity.

Broadly stated, the components receive input media information (video and/or audio information), provide some kind of transformation of the input information to provide transformed information, and then output the transformed information. Exemplary kinds of components include various types of video encoders, various types of audio encoders, various types of packetizers and multiplexers, and so forth. A video encoder refers to any kind of unit which transforms video information from one form to another. The video encoder may, for instance, compress the video information, scale the video information, change its color space, and so forth. Similarly, an audio encoder refers to any kind of unit which transforms audio information from one form to another. A packetizer refers to a unit which breaks video or audio information into packets having a defined size. Typically, packets include headers and payloads; the headers contain metadata which describes features of the information stored in the payloads, such as timing-related information associated with the information stored in the payloads. A multiplexer is a device which combines two or more signals into a composite signal. For example, a multiplexer can receive a stream of video information and a stream of audio information and produce an output that comprises interleaved packets of video and audio information. The components 104 can include yet other kinds of units not mentioned above.

Interface functionality 106 allows the application 102 to interact with the components 104. One function that the interface functionality 106 can perform is to handle the registry of components 104. In performing this function, the interface functionality 106 records salient information (e.g., metadata) regarding new components added to the pool of available components 104. Another function that the interface functionality 106 performs is to discover the available components 104, and, in particular, to determine the components which are available that can perform one or more tasks required by the application 102. In performing this function, the interface functionality 106 can compare the requirements of the application with the capabilities of the components 104 and select a group of components which satisfy the requirements. Another function that the interface functionality 106 performs is to configure the selected components. In performing this function, the interface functionality 106 can set various parameters that govern the manner in which the selected components operate. According to another function, the interface functionality 106 can control the operation of the selected group of components (collectively forming a "component module"), and can monitor its operation. In performing this function, the interface functionality 106 can collect statistical information regarding the operation of the component module. The interface functionality 106 can use this statistical information to improve the performance of the application 102. The following discussion provides more details regarding the above-identified functions and other aspects of the interface functionality 106.

In terms of physical implementation, the application 102 and interface functionality 106 can be implemented as two respective logic modules (implemented in hardware and/or software) provided by a computing device. For example, the application 102 can be implemented as an application program, and the interface functionality 106 can be implemented as an application programming interface (API). FIG. 7 provides one illustrative example of a computing environment that can be used to implement the application 102 and the interface functionality 106. In another exemplary implementation, the application 102 and the interface functionality 106 can be implemented using two separate units. For example, one or more features of the interface functionality 106 can be implemented as a detachable card which is communicatively coupled to a computer device which implements the application 102. Still further implementation permutations are possible.

The components 104 can likewise represent hardware and/or software units which are physically implemented by the same mechanism which implements the application 102 and/or interface functionality 106. For example, the components 104 may represent software units which are executed by the same computer device which implements the application 102 and/or the interface functionality 106. Alternatively, one or more of the components 104 can be implemented by a unit (such as a detachable card) which is separate from (but communicatively coupled to) the device which implements the application 102 and/or interface functionality 104. Still further implementation permutations are possible.

In any event, the interface functionality 106 can include management logic 108 for performing all the prescribed tasks assigned to the interface functionality 106. These tasks include at least the above-identified operations, such as registering components, discovering components, selecting components which match the requirements of the application 102, configuring the components, monitoring the operation of the components, and so forth.

The interface functionality 106 also includes a profile store 110. The profile store 110 stores profiles. A profile specifies configuration information that can be used to select and configure a group of components 104 to perform a prescribed task. For example, a DVD profile can contain parameters used to configure a pipeline to produce a DVD compliant output stream. The profile can contain: name information which identifies the profile; encoder/mux/packetizer parameters and media type descriptions; valid ranges associated with the operation of the component module to be built; a list of capabilities to filter candidate components by; a list of critical configuration parameters, and so forth. The application 102 can use a profile stored in the profile store 110 to provide "pre-canned" instructions to create a desired component module. For instance, supposing that the application needs to perform function X, it can identify, in the profile store 110, a profile $P_X$ which specifies how to create and configure a component module to perform function X. Actual creation of the component module comprises carrying out the instructions in the profile.

The interface functionality 106 also includes a component capability store 112. The capability store 112 stores capability lists. Each capability list describes the capabilities of a component, such as the characteristics of the components, its operating limitations, and so forth. The application 102 finds satisfactory components by comparing the requirements specified in a selected profile with the component capabilities advertised in the component capability store 112.

In one exemplary implementation, different elements of the profiles, capability lists, and configuration parameters can be identified using appropriate identifiers, such as GUIDs. For example, each distinct capability of a component can be identified with a different GUID. These GUID identifiers help manage and locate desired components. For example, a profile may specify one or more GUIDS, enabling the management logic 108 to determine whether there are any components which satisfy the features associated with the GUIDs by determining if there are matching GUIDs in the component capability store 112.

Although not shown in FIG. 1, the interface functionality 106 can also include a store for storing a hierarchical listing of configuration parameters used to configure a component module (in the manner to be described below).

Figure 2:
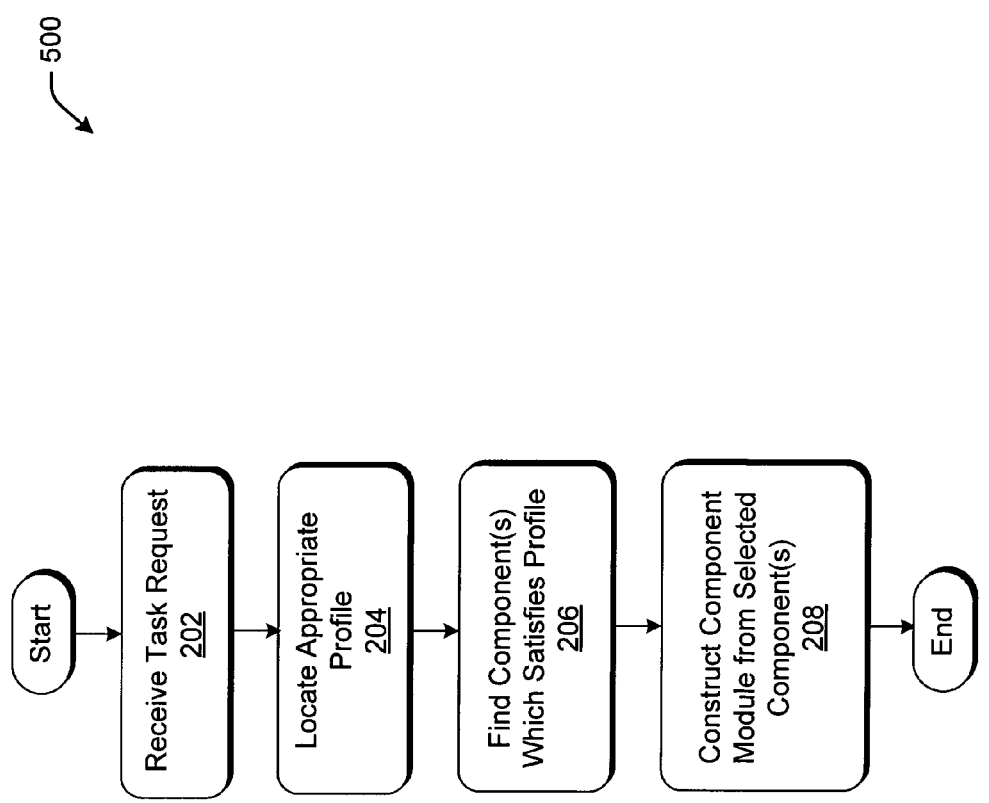
FIG. 2 shows a procedure which explains an exemplary manner of operation of the system of FIG. 1.

FIG. 2 shows a procedure 200 which explains an exemplary manner of operation of the system 100 shown in FIG. 1. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

In step 202 of the procedure 200, the management logic 108 receives a request to perform a task which will require the use of a component module.

In step 204, the management logic 108 locates a profile in the profile store 110 associated with the desired task. As mentioned above, the located profile describes how to create and configure a component module that will perform the desired task.

In step 206, the management logic 108 can find the component (or components) in the pool of available components 104 which can perform the selected profile. As mentioned above, this can be performed by matching the requirements of the profile with the attributes specified in the component capability store 112. In one case, this matching procedure can have at least two phases. In a first phase, the management logic 108 can identify components for which there is an express one-to-one match between specified application requirements and component capabilities. If all the requirements are not met in the first phase, in a second phase, the management logic 108 can re-examine any component for which there is no express match, but which might nevertheless possess the features necessary to satisfy the application requirements. For example, an application requirement might state, "find a component that has property Y." The first pass examines the component capability store 112 to determine whether there are any components which expressly state that they have the desired property. Some components may expressly state that they do not have this feature. These components are excluded from the search. But other components might not advertise that they have the desired feature, but may nonetheless still possess this feature. In the second phase, the management logic 108 will attempt to satisfy unmet requirements by re-examining any component which does not expressly conflict the application's requirements.

In step 208, the management logic 108 constructs the component module which will perform the desired task using the components selected in step 206. The component module is created in a specific manner, e.g., by adding components in a specified order, and setting configuration parameters in a specified order. This restraint helps reduce the possibility that the component module will be placed in an inconsistent state. As previously described, an inconsistent state is a state in which one component includes settings or requirements which conflict with the settings or requirements of another component (or components). An inconsistent state may impair the performance of the application 102, or completely disable the application 102.

Although not shown in FIG. 2, after the component module is created, the procedure 200 can monitor the performance of the component module. This is useful in order to collect statistical information regarding the operation of the component module, so as to improve the performance of the component module, and so forth. The interface functionality 106 can collect performance data by registering one or more events; upon the occurrence a registered event during the operation of the component module, the interface functionality 106 can log the event for use in forming statistics.

In one exemplary implementation, in performing the above operations, the potential candidate components can be enumerated and pre-filtered without actually creating an instance of each component. This feature makes the processing described above more efficient.

B. Exemplary Component Module

Figure 3:
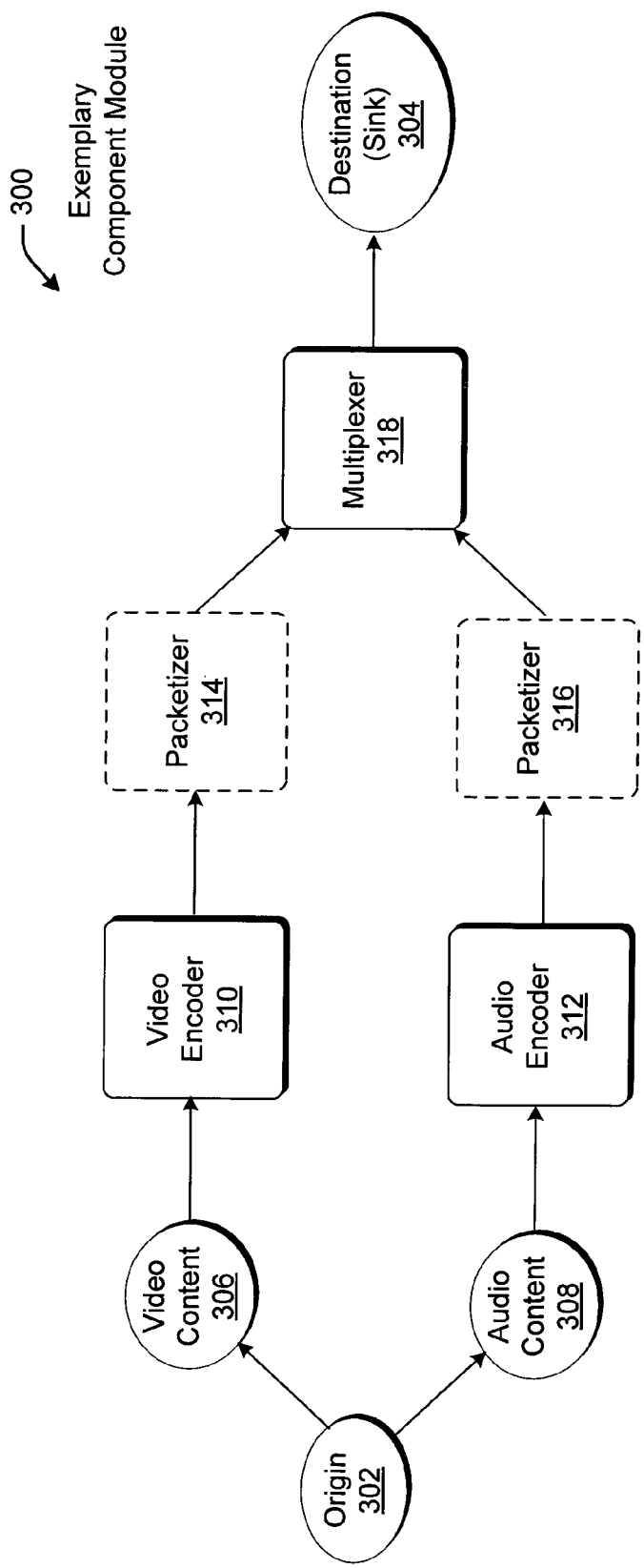
FIG. 3 shows an exemplary combination of components (a "component module") 7 that can be created using the system of FIG. 1.

FIG. 3 shows an exemplary component module 300. The component module 300 includes a collection of components selected from the pool of available components 104. The purpose of any component module is to receive information from an origin 302, perform some processing operation on the information to provide transformed information, and to supply to the transformed information to a destination (sink) 304.

The origin 302 may represent an original capture device which first produces the information. For example, the origin 302 may represent a video camera which captures audio-visual information. Alternatively, the origin 302 may represent any kind of source of pre-recorded information, such as audio-visual information retrieved from a file, a disk, a tape, a digital network, and so forth. The destination 304 may likewise have different connotations depending on different implementations. In one case, the destination 302 may represent a storage that is used to receive the transformed information produced by the component module 300. In another case, the destination may represent an output device (such as any kind of audio-visual output device) for presenting the transformed information. A television is one such output device. In another case, the destination may represent some target site coupled to a digital network. These are merely representative examples of possible origins 302 and destinations 304.

The specific combination of components shown in FIG. 3 performs an operation in which video information and audio information are encoded, and then this encoded information is broken up into packets which are interleaved together to form a final output result. More specifically, the source information received form the origin 302 may include two components: video information 306 and audio information 308. A video encoder 310 encodes the video information 306, while an audio encoder 312 encodes the audio information 308. Encoding can comprise transforming the information in any way, such as by compressing the information, changing the color space of the information, and so forth.

A video packetizer 314 receives the output of the video encoder 310 and breaks this output up into a series of video packets. An audio packetizer 316 receives the output of the audio encoder 312 and breaks this output up into a series of audio packets. As described above, each packet can include header information and payload information. The header information contains metadata which describes the payload information. For example, the header information may include timestamp information which describes the timing at which the information contained in the payload was captured, received, or otherwise subjected to some identified processing. FIG. 3 shows the packetizers (314, 316) as forming discrete units which are coupled to the output of the encoders (310, 312). This is one possibility. In another case, however, the packetizers (314, 316) can be integrated into the respective encoders (310, 312). In another case, the packetizers (314, 316) can be integrated in the multiplexer 318.

The multiplexer 318 itself receives the output of the packetizers and combines the packetized video information with the packetized audio information into a single stream of information. The multiplexer 318 can perform this combination by interleaving the video information with the audio information according to a defined format. The component module 300 then forwards the interleaved stream to the destination 304.

To repeat, the composition of the component module 300 shown in FIG. 3 is merely exemplary. Other arrangements are possible.

According to one exemplary implementation, the interface functionality 106 creates the component module 300 in a predefined order so as to reduce the possibility of producing an inconsistent state. Generally, the build process proceeds by constructing the pipeline topology from the multiplexer to the encoders. The following presents an overview of an exemplary build order:
1) Define/create the origin 302 and destination 304.
2) Create and configure the multiplexer 318.)
3) Connect the output of the multiplexer 318 to the destination 304.
4) Create and configure the encoders (310, 312).
5) Connects the output of the encoders (310, 312) to the multiplexer 318 (via the packetizers, if these are present as separate units).
6) Finish configuring the component module.

In one case, the pipeline is constructed using a profile. The following exemplary list of operations describes one way of creating the component module using the profile:
1) Define/create the destination 304.
2) Build an encoding and multiplexing topology.
   a) Select the multiplexer 318.
   b) Configure the multiplexer 318 based on an applicable profile, including a number of input streams.
   c) Connect the multiplexer 318 to the destination 304.
   d) For each multiplexer input:
     i. Select an encoder (310, 312).
     ii. Configure the encoder (310, 312) based on the profile.
     iii. Connect the encoder (310, 312) to the multiplexer's input.
3) Create the media's video and audio sources (origin 302).
4) Join the source (origin 302) to the partially built encoding topology.

This order of operations described above is representative; other orderings are possible.

One general feature of the exemplary approach described above is that a component can be configured and then logically connected to a downstream component. By virtue of this feature, it is possible to effectively address, in a structured manner, many conflicts and ambiguities that may occur in the course of component configuration. For example, a typical problem occurs when the source image size does not match the image size specified for a particular encoding task. For instance, DVD movies are typically compressed at a resolution of 720×480 pixels. If the source content is at 1920×1080 pixels, then it may be unclear which component in a combination of components should scale (e.g., "shrink") the image to the appropriate size. By configuring the output resolution setting on the encoder, the encoder can choose to scale down the input content if possible. If the encoder is unable to scale down the image resolution, then this component can indicate (e.g., by connection failure) to the entity building the topology that the image source needs to scale down the size of the image. If that option fails, then the entity can create a generic image processing object to reduce the size of the image.

C. Exemplary Ordering of Configuration Parameters

Figure 4:
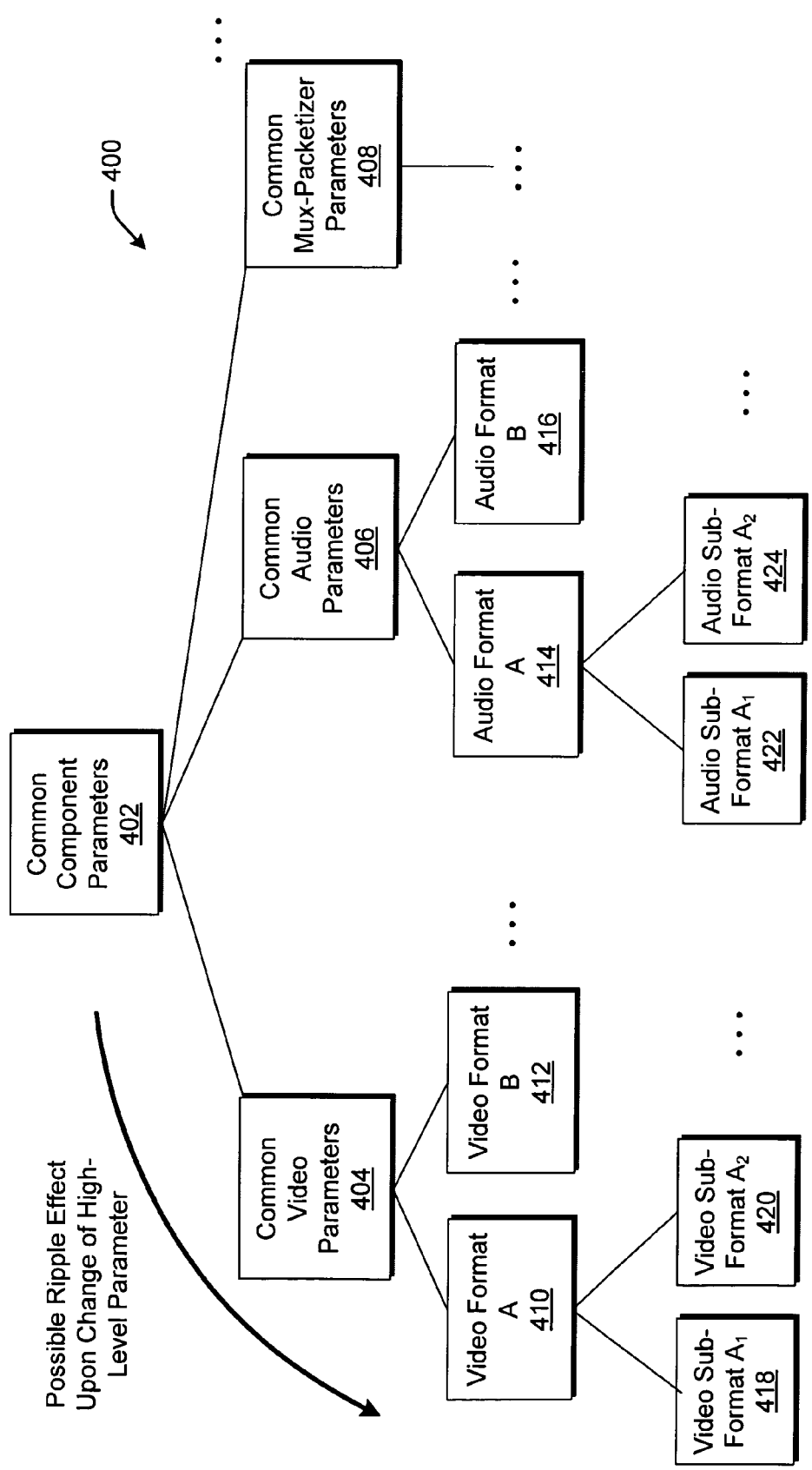
FIG. 4 shows an exemplary hierarchical ordering of configuration parameters that 9 can be used in the system of FIG. 1.

FIG. 4 shows an exemplary ordering 400 of configuration parameters. The configuration parameters are used to define the configuration of the different components shown in FIG. 3 (or the configuration of some other kind of component module not shown). The parameters can be set by associated functionality (e.g., API functionality) provided by the interface functionality 106. Thus, the ordering 400 shown in FIG. 4 is also representative of the organization of API functionality used to set the indicated parameters. This section provides an overview of the ordering 400 shown in FIG. 4, while Section E describes, in greater detail, exemplary parameters that can populate the ordering 400.

In general, the parameters shown in FIG. 4 define a collection of nodes. The nodes form a tree of parameters, where each node may have one or more child nodes, and each child node may have, in turn, one or more of its own child nodes, and so forth. The parameters become increasingly more detailed as the tree is traversed from "top" to "bottom." For example, one or more top-level nodes define a collection of parameters which may apply to a wide variety of components and coding paradigms. In this sense, these parameters define component-agnostic and coding paradigm-agnostic settings. On the other hand, lower level parameters may more narrowly pertain to specific components and/or coding paradigms.

One general characteristic of the ordering 400 is top-down configuration-dependence. According to this characteristic, a change in a top-level parameter in the ordering 400 may affect lower-ranking dependent parameters (if they exist). In another words, if a change is made to a parent parameter, then the interface functionality 106 may propagate this change down the ordering 400 to make complementary changes to child parameters, grandchild parameters, and so forth. For example, a user may select a parameter associated with a relatively high-level node. This parameter may create a conflict with pre-existing child node parameters, requiring a change to be made to the child node parameters to rectify this conflict. In some cases, rectifying a conflict may require disabling one or more components (or features of components) that serve no useful function after a change has been made to a top-level parameter.

The use of the hierarchical ordering 400 shown in FIG. 4 has numerous benefits. According to one benefit, the application 302 can configure the component module 300 at various levels of granularity depending on the demands of the application. For example, one application can allow a user to configure the component module 300 (or can automatically configure the component module 300) at a relatively high-level, setting only general parameters relevant to certain broad aspects of the operation of the component module 300. On the other hand, another application can allow a user to configure the component module 300 (or can automatically configure the component module 300) at a relatively detailed level, setting a number of format-specific parameters that serve to fine-tune the operation of the component module 300. This variable-grained approach is advantageous because it does not burden the user by requiring the user to specify a host of parameters which have no bearing on performance features that the user considers important. To repeat, regardless of the level of detail in which an application configures a component module, it draws from the same stock ordering 400, essentially exposing different depths of the ordering 400 in configuring the component module.

According to another general benefit, the strong ordering 400 shown in FIG. 4 helps reduce the potential that the component module 300 will be configured in a manner that will produce an inconsistent state. In one exemplary implementation, parameters should be generally defined in a top-down manner, in which the user makes top-level parameter selections prior to lower-level parameter selections. In those cases where the user is permitted to make configuration choices, the application 102 can tailor the user 19 interface presentations as selection progresses, that is, by removing selection options that no longer pertain to a prevailing state of a configuration operation.

According to another benefit, the ordering 400 shown in FIG. 4 represents a standardized approach to configuring component modules. Such standardization produces a highly extensible design approach. Namely, the ordering 400 permits new configuration parameters to be orderly added to the tree, and out-of-date configuration parameters to be removed from the tree without requiring detailed re-engineering of the configuration strategy as a whole. New configuration parameters are added to the existing order 400 at an appropriate location in the tree, based on the classification of the new parameters.

With the above introduction, further details will be provided below regarding exemplary nodes within the ordering 400. Section E (below) provides yet more detailed information regarding the parameters shown in FIG. 4.

To begin with, a top-level node 402 represents parameters that apply to any component within the component module 300 (including encoders, packetizers, multiplexers, and so forth). This node 402 also represents parameters that can apply to any coding paradigm used by the components. The parameters associated with this node 402 are therefore relatively basic and general-purpose in nature.

At the next level, node 404 represents parameters that apply to any kind of video encoder, regardless of the coding paradigm used by the video encoder. Node 406 represents parameters that apply to any kind of audio encoder, regardless of the coding paradigm used by the audio encoder. Node 408 represents parameters that can apply to any packetizer and/or multiplexer, regardless of coding paradigm. (Note that the packetizers and multiplexer may represent distinct components in the component module 300, or the packetizers may be combined with the encoders or the multiplexer; at this level of explanation, however, the packetizers and multiplexers are lumped together as a single topic of explication.)

At the next level in the hierarchical ordering 400, nodes 410 and 412 represent parameters that pertain to broad classes of defined video coding paradigms. Nodes 414 and 416 represent parameters that pertain to broad classes of audio coding paradigms. Although only two video coding paradigms (410, 412) and two audio coding paradigms (414, 416) are shown in FIG. 4, the reader will appreciate that the ordering 400 can include additional coding paradigms.

At the next level, nodes 418 and 420 represent parameters that pertain to two particular species of the general video coding paradigm associated with node 410. Nodes 422 and 424 represent parameters that pertain to two particular species of the general audio coding paradigm associated with node 414. Although only two video coding paradigm species (418, 420) and two audio coding paradigm species (422, 424) are shown in FIG. 4, the reader will appreciate that the ordering 400 can include additional coding paradigm species. Moreover, there can be yet further levels in the ordering 400 (not shown in FIG. 4).

Figure 5:
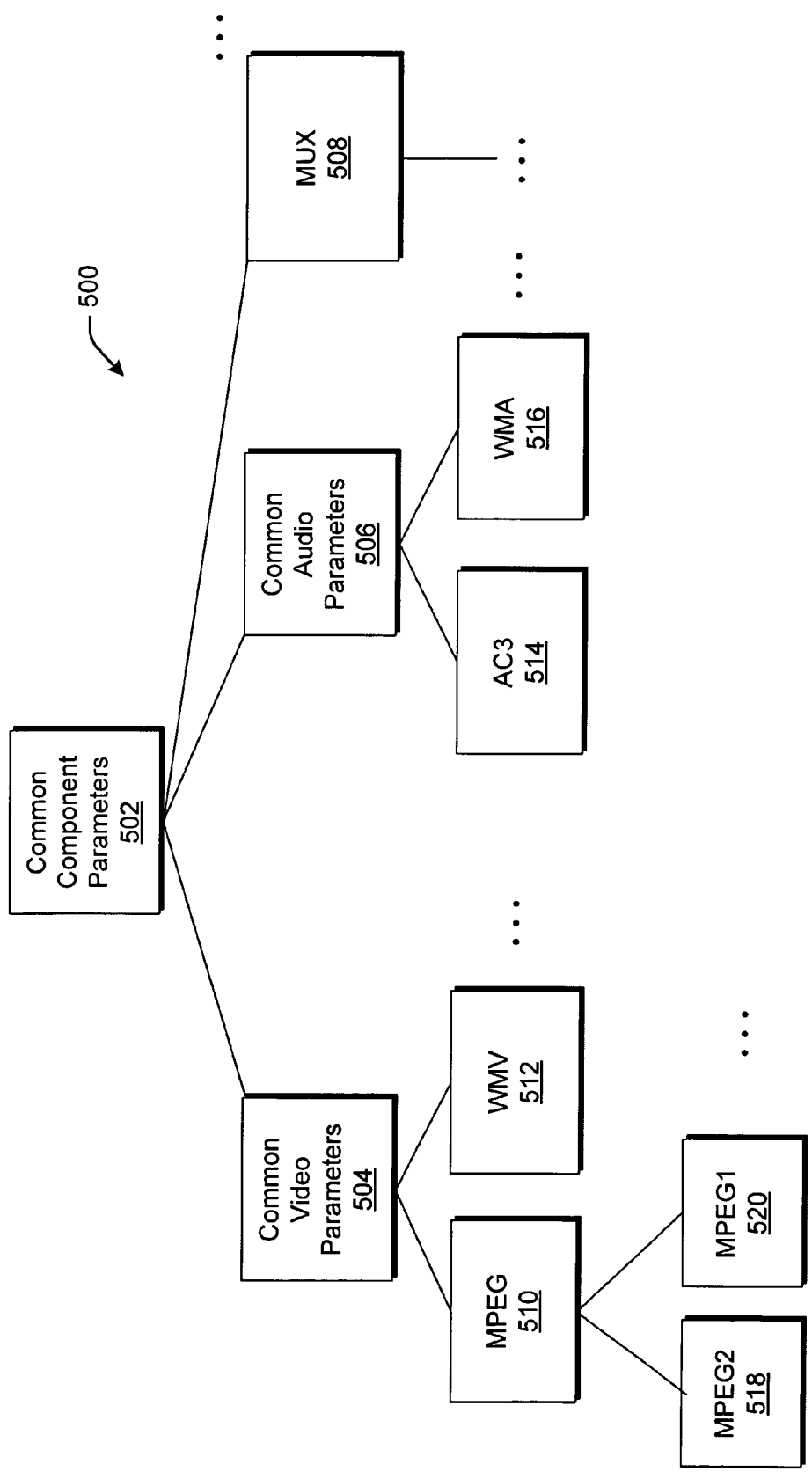
FIG. 5 shows a more detailed version of the hierarchical ordering shown in FIG. 4.

FIG. 5 provides one specific implementation of the ordering 400 shown in FIG. 4. The top-level nodes in the order 500 shown in FIG. 5 correspond to the top-level nodes shown in FIG. 4. Namely, root node 502 represents parameters that apply to any component in the component module 300, and encompass any coding paradigm. Node 504 represents parameters that apply to any video encoder regardless of coding paradigm. Node 506 represents parameters that apply to any audio encoder regardless of coding paradigm. Node 508 represents parameters that apply to any multiplexer, regardless of coding paradigm.

In the next level, node 510 represents MPEG (Moving Picture Experts Group) parameters that are specifically associated with the MPEG coding paradigm. Node 512 represents SMPTE VC1 (Society of Motion Picture Television Engineers, standard VC1) (also referred to as WMV or Windows Media Video) parameters that are specifically associated with the WMV coding paradigm. Node 514 represents AC3 (Audio Coding Revision 3) parameters that are specifically associated with the AC3 coding paradigm. Node 516 represents WMA (Windows Media Audio) parameters that are associated with the WMA coding paradigm.

In the next level, nodes 512 and 520 represent two specific MPEG coding paradigms for processing video information, namely the MPEG1 standard (ISO/IEC 11172) and the MPEG2 standard (ISO/IEC 13818). Although not shown, the hierarchical ordering can also incorporate a node corresponding to the H.264 standard (MPEG-4 Part 10, ISO/IEC 14496-10, Advanced Video Coding (AVC)), as well as other formats.

Once again, the nodes shown in FIG. 5 may represent a sampling of a more encompassing tree of configuration nodes (not shown). In other words, the ordering 500 can encompass more nodes (not shown) associated with additional kinds of components, coding paradigms, and so forth.

FIG. 6 represents one of the above-identified characteristics of the ordering (400, 500) in flowchart form. Namely, the procedure 600 shown in FIG. 6 conveys the fact that a selection of a high-level parameter may affect dependent lower-level parameters.

In step 602, the interface logic 106 receives the user's selection of a parameter that has at least one child parameter dependent thereon. Or step 602 may indicate the receipt of an automatic selection of a parameter.

In step 604, the interface logic 106 determines whether the high-level change requires any complementary changes to made in dependent lower-level parameters, and, if so, makes those changes. If appropriate, step 604 can involve notifying the user of the need to make certain selections, and receiving input from the user to reflect the user's choices.

FIG. 7 describes an exemplary procedure 700 for establishing components in a defined order (as explained in greater detail in the previous section).

In step 702, at least one multiplexing component is established.

In step 704, at least one packet-forming component per multiplexer input stream is established.

In step 706, at least one media encoder is established.

D. Exemplary Computer Environment

As described above, certain aspects of the system 100 shown in FIG. 1 can be implemented using a computer device. For example, certain aspects of the application 102, interface functionality 106 and components 104 can be implemented by a computing device. In another implementation, one or more aspects of the system 100 can be implemented by a separate device (such as a processing card) which interacts with the computer device. In any event, FIG. 8 shows an exemplary computer environment 800 which can implement aspects of the system 100 shown in FIG. 1.

The computing environment 800 includes a general purpose or sever type computer 802 and a display device 804. However, the computing environment 800 can include other kinds of computing equipment. For example, although not shown, the computer environment 800 can include hand-held or laptop devices, set top boxes, game consoles, etc. Further, FIG. 8 shows elements of the computer environment 800 grouped together to facilitate discussion. However, the computing environment 800 can employ a distributed processing configuration. In a distributed computing environment, computing resources can be physically dispersed throughout the environment.

Exemplary computer 802 includes one or more processors or processing units 806, a system memory 808, and a bus 810. The bus 810 connects various system components together. For instance, the bus 810 connects the processor 806 to the system memory 808. The bus 810 can be implemented using any kind of bus structure or combination of bus structures, including a memory bus or memory controller, a peripheral bus, an accelerated graphics port, and a processor or local bus using any of a variety of bus architectures.

Computer 802 can also include a variety of computer readable media, including a variety of types of volatile and non-volatile media, each of which can be removable or non-removable. For example, system memory 808 includes computer readable media in the form of volatile memory, such as random access memory (RAM) 812, and non-volatile memory, such as read only memory (ROM) 814. ROM 814 includes an input/output system (BIOS) 816 that contains the basic routines that help to transfer information between elements within computer 802, such as during start-up. RAM 812 typically contains data and/or program modules in a form that can be quickly accessed by processing unit 806.

Other kinds of computer storage media include a hard disk drive 818 for reading from and writing to a non-removable, non-volatile magnetic media, a magnetic disk drive 820 for reading from and writing to a removable, non-volatile magnetic disk 822 (e.g., a "floppy disk"), and an optical disk drive 824 for reading from and/or writing to a removable, non-volatile optical disk 826 such as a CD-ROM, DVD-ROM, or other optical media. The hard disk drive 818, magnetic disk drive 820, and optical disk drive 824 are each connected to the system bus 810 by one or more data media interfaces 828. Alternatively, the hard disk drive 818, magnetic disk drive 820, and optical disk drive 824 can be connected to the system bus 810 by a SCSI interface (not shown), or other coupling mechanism. Although not shown, the computer 802 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 802. For instance, the readable media can store the operating system 830, application-specific functionality 832 (including functionality for implementing aspects of the application 102), other program modules 834, and program data 836. One or more of the above-identified computer readable media can also implement aspects of the interface functionality 106 and the components 104. In cases were one or more of the components represent hardware units (not shown in FIG. 8), these units can interact with the components shown in FIG. 8 through appropriate coupling interfaces (such as coupling mechanisms associated with processing cards).

The computer environment 800 can include a variety of input devices. For instance, the computer environment 800 includes the keyboard 838 and a pointing device 840 (e.g., a "mouse") for entering commands and information into computer 802. The computer environment 800 can include other input devices (not illustrated), such as a microphone, joystick, game pad, satellite dish, serial port, scanner, card reading devices, digital or video camera, etc. Input/output interfaces 842 couple the input devices to the processing unit 806. More generally, input devices can be coupled to the computer 802 through any kind of interface and bus structures, such as a parallel port, serial port, game port, universal serial bus (USB) port, etc.

The computer environment 800 also includes the display device 804. A video adapter 844 couples the display device 804 to the bus 810. In addition to the display device 804, the computer environment 800 can include other output peripheral devices, such as speakers (not shown), a printer (not shown), etc.

Computer 802 operates in a networked environment using logical connections to one or more remote computers, such as a remote computing device 846. The remote computing device 846 can comprise any kind of computer equipment, including a general purpose personal computer, portable computer, a server, etc. Remote computing device 846 can include all of the features discussed above with respect to computer 802, or some subset thereof.

Any type of network 848 can be used to couple the computer 802 with remote computing device 846, such as the WAN 402 of FIG. 4, a LAN, etc. The computer 802 couples to the network 848 via network interface 850 (e.g., the interface 416 shown in FIG. 4), which can utilize broadband connectivity, modem connectivity, DSL connectivity, or other connection strategy. Although not illustrated, the computing environment 800 can provide wireless communication functionality for connecting computer 802 with remote computing device 846 (e.g., via modulated radio signals, modulated infrared signals, etc.).

E. Appendix 1: Exemplary Parameters

This section provides additional information regarding one exemplary implementation of the ordering 400 of parameters introduced in the context of FIG. 4, and associated topics.

By way of preliminary remarks, the configuration parameters can be identified using GUIDs. A GUID value is encoded as a string (e.g., "{08bdf183-f2f2-4c80-ba86-0fd5257561c9}"). But in other implementations, the configuration parameters can be identified using other kinds of identifiers.

In most cases, the names assigned to the parameters and attributes reflect the respective roles served by the parameters and attributes. Thus, many of the parameters and attributes are self-explanatory based on the assigned names themselves.

Common Parameters

The common parameters identify a set of parameters that are common to all encoders, packetizers, and multiplexers, etc., and which apply to all coding paradigms. Exemplary common parameters are described below.

An AVEncCommonFormatConstraint configuration parameter identifies, for the encoder, a target format for parameter legalization. Exemplary settings associated with this configuration parameter include:

GUID_AVEncCommonFormatUnSpecified
GUID_AVEncCommonFormatDVD_V
GUID_AVEncCommonFormatDVD_DashVR
GUID_AVEncCommonFonmatDVD_PlusVR
GUID_AVEncCommonFormatDVD_VFR
GUID_AVEncCommonFormatVCD
GUID_AVEncCommonFormatSVCD
GUID_AVEncCommonFormatATSC
GUID_AVEncCommonFormatDVB
GUID_AVEncCommonFormatMP3
GUID_AVEncCommonFormatHighMAT
GUID_AVEncCommonFormatHighMPV An AVEncCodecType configuration parameter indicates the types of coding schemes supported by a component. This configuration parameter can specify the following exemplary types:

GUID_AVEncMPEG1Video
GUID_AVEncMPEG2Video
GUID_AVEncMPEG1Audio
GUID_AVEncMPEG2Audio
GUID_AVEncWMV
GUID_AVEndMPEG4Video
GUID_AVEnCH264Video
GUID_AVEncDV
GUID_AVEncWMAPro
GUID_AVEncWMALossless
GUID_AVEncWMAVoice
GUID_AVEncDolbyDigitalPro
GUID_AVEncDolbyDigitalConsumer
GUID_AVEncDTS
GUID_AVEncMLP
GUID_AVEncPCM
GUID_AVEncSDDS An AVEncCommonRateControlMode configuration parameter describes the rate control mode to be used, e.g., constant bit rate (CBR), variable bit rate (VBR), or quality mode. This parameter can specify the following exemplary settings:

eAVEncCommonRateCBR=0
eAVEncCommonRatePeakConstrainedVBR=1
eAVEncCommonRateUnconstrainedVBR=2
eAVEncCommonRateQuality=3

RateQuality indicates that compression is driven by a quality target (controlled by CommonQuality), identifying a threshold quality to be maintained in the encoding operation.

An AVEncCommonLowLatency configuration parameter indicates that the output stream should be structured to have a low decoding latency. For example, in video, this setting limits the GOP structures that are allowed in an encoder to facilitate quick switches. (For example, it is normally prudent in MPEG processing to start the presentation of information at a key frame, rather than a difference frame, e.g., a B or P frame. This requirement, however, imposes a delay, because the encoder must wait for a key frame to start presenting the information. A low latency mode modifies the presentation of information such that it accommodates quick switches, e.g., by presenting only key frames, etc.).

An AVEncCommonMultipassMode configuration parameter indicates a number of passes supported by the encoder. More specifically, the encoder can process information in multiple passes. Often, for instance, the encoder applies a first pass to collect statistical parameters that provide information regarding the nature of the encoding task, and then the encoder applies a second pass to rebalance and better optimize the processing based on the statistical parameters collected in the first pass. With the AVEncCommonMultipassMode configuration parameter, users can select a number of passes within an available range. AVEncCommonPassStart (described below) is used to select which pass is active.

An AVEncCommonPassStart configuration parameter starts the first pass.

An AVEncCommonPassEnd configuration parameter ends the pass (by writing TRUE). Writing FALSE aborts the multipass operation.

An AVEncCommonRealTime configuration parameter informs the encoder that the application requires real time performance. This parameter can specify the following exemplary settings:

0=no real time requirement
1=real time performance is required

An AVEncCommonQuality parameter (if available) controls the quality during non-bit rate constrained encoding. This parameter can specify the following exemplary settings:

100=maximum quality, larger output size
0=minimum quality, smaller output size

An AVEncCommonQualityVsSpeed configuration parameter defines quality verses speed tradeoff considerations. This parameter can specify the following exemplary settings:

0=low quality, high speed
100=high quality, lower speed

An AVEncCommonMeanBitRate configuration parameter specifies an average long term bit rate target for CBR or VBR rate control modes. This parameter supports media processing functionality that has only a restricted set of allowed bit rates, such as MPEG1 audio.

An AVEncCommonMeanBitRateInterval configuration parameter indicates the interval that an average bit rate is specified over (e.g., 100 ns units). For two-pass VBR, a value of 0 specifies the entire content. For a single-pass CBR, a value of 0 specifies that the component can choose the interval (e.g., 0.5 sec).

An AVEncCommonMaxBitRate configuration parameter specifies a maximum bit rate, and applies to CBR or VBR rate control modes.

An AVEncCommonMinBitRate configuration parameter specifies a minimum bit rate, and applies to CBR or VBR rate control modes. A forced minimum bit rate can be achieved by increasing the quality. One use of this parameter is to prevent the encoder from compressing certain information to the point where the media processing functionality emits no output data (which has the tendency to stall the media processing functionality). This can happen, for example, when an encoder compresses a black image. The minimum bit rate parameter prevents the encoder from reducing its output to zero, and thereby reduces the potential of such stalls.

An AVEncCommonBufferSize configuration parameter specifies the size of the buffer to be used during encoding. This parameter applies to CBR or PeakVBR rate control modes. For MPEG, this parameter defines the VBV buffer size.

An AVEncCommonBufferInLevel configuration parameter specifies an initial level of the buffer to support concatenation of streams. This parameter applies to CBR or PeakVBR rate control modes. For MPEG video, this parameter defines the initial VBV buffer level.

An AVEncCommonBufferOutLevel configuration parameter specifies a level of the buffer at the end of an encoding operation to support concatenation of streams. This parameter applies to CBR or PeakVBR rate control modes. For MPEG video, this parameter defines the VBV buffer level at the end of the encoding operation. In general, one use of the AVEncCommonBufferInLevel and AVEncCommonBufferOutLevel configuration parameters is to facilitate video editing operations, e.g., by better controlling the amount of information that is passed into and pulled out of the buffer during a video editing operation.

An AVEncCommonStreamEndHandling configuration parameter specifies the manner in which a stream is encoded upon its termination. For example, a stream end event may truncate information that is being presented. The AVEncCommonStreamEndHandling configuration parameter defines how the encoder handles this truncation, e.g., by permitting an incomplete truncation or by "fixing up" the truncation such that the encoder is allowed to encode data up to a more graceful termination point. More specifically, this parameter can specify the following exemplary settings:
 eAVEncCommonStreamEnd_discardPartial=0
 eAVEncCommonStreamEnd_ensureComplete=1
 Common Post-Encode Statistical Parameters An AVEncStatCommonCompletedPasses configuration parameter indicates a completed number of passes. This parameter is therefore meaningful for multi-pass encoding operations.

Common Video Parameters

An AVEncVideoOutputFrameRate configuration parameter specifies an output frame rate defined by a numerator/denominator ratio, specifying frames/second. This parameter can specify the following exemplary settings:
 23.97FPS=(24000/1001)
 24FPS=(24/1)
 25FPS=(25/1)
 29.97FPS=(30000/1001)
 30FPS=(30/1)
 50FPS=(50/1)
 59.94FPS=(60000/1001)
 60FPS=(60/1)

The value of this parameter may be restricted to the connected input rate.

An AVEncVideoOutputFrameRateConversion configuration parameter provides output frame rate conversion control if the input frame rate does not match the desired output frame rate. This parameter can specify the following exemplary settings:
 0=disable
 1=enable
 2=alias (This setting instructs the encoder not to perform any interpolation, e.g., by merely changing the sample timestamps; this is useful in various situations in which it is desirable to simply pass information through the component without transformation.)

An AVEncVideoPixelAspectRatio control parameter defines a PixelAspectRatio, width/height. This parameter can specify the following exemplary settings:
 4×3 images of 704×480, 720×480, and 352×240 are 10/11
 16×9 image of 704×480, 720×480, and 352×240 are 40/33
 4×3 images of 704×576, 720×576, and 352×288 are 12/11
 16×9 images of 704×576, 720×576, and 352×488 are 16/11
 4×3 images of 320×240, 640×480, 1280×960 are 1/1
 16×9 images of 320×240, 640×480, 1280×960 are 4/3
 16×9 image of 1280×720, 1920×1080 are 1/1
 16×9 image of 1440×1080 is 4/3
 4×3 image of 144×1080 is 16/9

An AVEncVideoForceSourceScanType configuration parameter indicates the nature of the output. This parameter can specify the following exemplary settings:
 0=use connecting media type
 1=interlaced
 2=progressive An AVEncVideoNoOfFieldsToEncode configuration parameter defines a number of fields to encode. This is to support telecine modes. The value "0" specifies no limit.

An AVEncVideoNoOfFieldsToSkip configuration parameter defines a number of fields to skip prior to encoding.

An AVEncVideoEncodeDimensionconfiguration parameter specifies the spatial dimensions of the coded stream if less than the connected input source. This parameter can be used for cropping.

An AVEncVideoEncodeOffsetOrigin configuration parameter operates in conjunction with AVEncVideoEncodeDimension. This parameter specifies the start top left offset position of the coded image for cropping purposes.

An AVEncVideoDisplayDimension configuration parameter specifies the desired display dimension of the coded stream during decode.

An AVEncVideoOutputScanType configuration setting specifies the manner in which the encoder is to interlace the output. This parameter can specify the following exemplary settings:
 0=progressive
 1=interlace
 2=same as input, or auto if not present
 3=auto, ignore input An AVEncVideoInverseTelecineEnable configuration parameter enables internal inverse telecine when processing interlaced input. For external telecine control, output scantype can be set to "same as input."

An AVEncVideoInverseTelecineThresholdLinear configuration parameter specifies a linear range that controls a level at which the encoder considers a video field redundant, and thereby can be treated as a film frame. This parameter is useful for performing inverse telecine from analog sources.

This parameter can specify the following exemplary boundary settings:

0=video field is less likely to be considered redundant
100=video field is very likely to be considered redundant An AVEncVideoSourceFilmContent configuration parameter provides a hint to the encoder as to the video source type with regard to film content. This parameter can specify the following exemplary settings:

eAVEncVideoFilmContentVideoOnly=0
eAVEncVideoFilmContentFilmOnly=1
eAVEncVideoFilmContentMixed=2

An AVEncVideoSourceIsBW configuration parameter indicates whether the video source contains color. This parameter can specify the following exemplary settings:

1=black and white (monochrome) source
0=color source

An AVEncVideoFieldSwap Bool configuration parameter reverses the interlaced fields in the video source image. This parameter can specify the following exemplary settings:

0=no swap
1=swap field order

AVEncVideohiputChromaResolution and AVEncVideooutputChromaResolution configuration parameters specify the chroma subsampling structure. These parameters can specify the following exemplary settings:

VideoChromaResolution_444=1
VideoChromaResolution_422=2
VideoChromaResolution_420=3
VideoChromaResolution_411=4

AVEncVideoInputChromaSubsampling and AVEncVideoOutputChromaSubsampling configuration parameters specify the chroma subsampling structure used to describe the relationship of the chroma to the luma data. These parameters can specify the following exemplary settings:

SameAsSource=0,
ProgressiveChroma=0x8,
Horizontally Cosited=0x4
Vertically_Cosited=0x2
AlignedChromaPlanes=0x1

AVEncVideohnputColor Primaries and AVEncVideoOutputColor Primaries configuration parameters specify the color primaries for output (and default for input if not given). These parameters can specify the following exemplary settings:

eAVEncVideoColor Primaries_SameAsSource=0
eAVEncVideoColor Primaries_Reserved=1
eAVEncVideoColor Primaries_BT709=2
eAVEncVideoColor Primaries_BT470_2_SysM=3
eAVEncVideoColor Primaries_BT470_2_SysBG=4
eAVEncVideoColor Primaries_SMPTE170M=5
eAVEncVideoColor Primaries_SMPTE240M=6
eAVEncVideoColor Primaries_EBU3231=7

AVEncVideoInputColorTransferFunction and AVEncVideoOutputColorTransferFunction configuration parameters specify the transfer parameter (variation of gamma) used to code data. These parameters can specify the following exemplary settings:

eAVEncVideoColorTransferFunction_SameAsSource=0
eAVEncVideoColorTransferFunction_10=1 (Linear, scRGB)
eAVEncVideoColorTransferFunction_18=2
eAVEncVideoColorTransferFunction_20=3
eAVEncVideoColorTransferFunction_22=4 (BT470-2 SysM)
eAVEncVideoColorTransferFunction_22_709=5 (BT709, SMPTE296M, SMPTE170M, BT470, SMPTE274M, BT.1361)
eAVEncVideoColorTransferFunction_22_240M=6 (SMPTE240M, interim 274M)
eAVEncVideoColorTransferFunction_22_8 bit_sRGB=7 (SRGB)

AVEncVideoInputColorTransferMatrix and AVEncVideoOutputColorTransferMatrix configuration parameters specify the conversion matrix used to convert from RGB to YCbCr. These parameters can specify the following exemplary settings:

eAVEncVideoMatrixSameAsSource=0
eAVEncVideoMatrixBT709=1
eAVEncVideoMatrixBT601=2 (601, BT470-2 B,B, 170M)
eAVEncVideoMatrixSMPTE240M=3

AVEncVideoInputColorLighting and AVEncVideoOutputColorLighting configuration parameters specify the intended lighting conditions on the input (if not specified) and output data. These parameters can specify the following exemplary settings:

eAVEncVideoColorLighting_SameAsSource=0
eAVEncVideoColorLighting_Unknown=1
eAVEncVideoColorLighting_Bright=2
eAVEncVideoColorLighting_Office=3
eAVEncVideoColorLighting_Dim=4
eAVEncVideoColorLighting_Dark=5

AVEncVideoInputColor NominalRange and AVEncVideoOutputColor NominalRange configuration parameters specify the nominal range that 0 to 1 is mapped to for RGB formats (such as 0 to 255 or 16 to 235). These parameters can specify the following exemplary settings:

eAVEncVideoColor NominalRange_SameAsSource=0
eAVEncVideoColor NominalRange_0_255=1, //(8 bit: 0 to 255, 10 bit: 0 to 1023)
eAVEncVideoColor NominalRange_16_235=2, //(16 to 235, 64 to 940 (16*4 to 235*4)
eAVEncVideoColor NominalRange_48_208=3 //(48 to 208)

An AVEncInputVideoSystem configuration parameter specifies the video system of the content. This parameter can specify the following exemplary settings:

eAVEncMPVVideoFormatComponent=0
eAVEncMPVVideoFormatPAL=1
eAVEncMPVVideoFormatNTSC=2
eAVEncMPVVideoFormatSECAM=3
eAVEncMPVVideoFormatMAC=4
eAVEncMPVVideoFormatHDV=5

An AVEncVideoHeaderDropFrame configuration parameter specifies the setting of the drop frame flag in the GOP Header.

An AVEncVideoHeaderHours configuration parameter specifies the starting hours in the GOP header, e.g., 0 to 59.

An AVEncVideoHeaderMinutes configuration parameter specifies the starting minutes in the GOP header, e.g., 0 to 59.

An AVEncVideoHeaderSeconds configuration parameter specifies the starting seconds in the GOP header, e.g., 0 to 59.

An AVEncVideoHeaderFrames configuration parameter specifies the starting frames in the GOP header, e.g., 0 to 24, or 0 to 29, or 0 to 23 for film.

An AVEncVideoDefaultUpperFieldDominant configuration parameter sets the field dominance of the input video.

An AVEncVideoCBRMotionTradeoff configuration parameter indicates the tradeoff between motion and still images when performing CBR encoding. This parameter can specify the following exemplary settings:

0=optimize for still images

100=optimize for motion

An AVEncVideoCodedVideoAccessUnitSize configuration parameter specifies access unit size (and is used for still image applications in VBR rate control).

Common Post-Encode Video Statistical Parameters

An AVEncStatVideoOutputFrameRate configuration parameter specifies the average frame rate, in frames per second, of video content. This value can be obtained after the completion of encoding.

An AVEncStatVideoCodedFrames configuration parameter specifies the number of video frames encoded by the media processing functionality. This value is equal to AVEncStatVideoTotalFrames minus any frames that were dropped due to bit rate constraints or end of stream handling issues.

An AVEncStatVideoTotalFrames configuration parameter specifies the number of video frames passed to the media processing functionality.

Common Audio Parameters

An AVEncAudioSampleRate configuration parameter identifies the sample rate of the audio.

An AVEncAudioInputChannelCount configuration parameter specifies the total number of audio input channels to be coded.

An AVEncAudioChannelConfig configuration parameter specifies the number of coded channels. This parameter can specify the number of coded channels as follows:

0x01—LFE channel
0x02—Left (L)
0x04—Right (R)
0x08—Center (C)
0x10—left side (ls)
0x20—right side (rs)

An AVEncAudioIntervalToEncode configuration parameter specifies the audio interval to encode. The value "0" specifies that no limit applies.

An AVEncAudioIntervalToSkip configuration parameter specifies an audio interval to skip (used in conjunction with IntervalEncode to perform range encodings).

An AVEncAudioMapDestChannel0 configuration parameter specifies the destination channel 0 mapping to source channel, zero based mapping.

An AVEncAudioMapDestChannel1 configuration parameter specifies the destination channel 1 mapping to source channel, zero based mapping.

An AVEncAudioMapDestChannel2 configuration parameter specifies the destination channel 2 mapping to source channel, zero based mapping.

An AVEncAudioMapDestChannel3, configuration parameter specifies the destination channel 3 mapping to source channel zero based mapping.

An AVEncAudioMapDestChannel4 configuration parameter specifies the destination channel 4 mapping to source channel, zero based mapping.

An AVEncAudioMapDestChannel5 configuration parameter specifies the destination channel 5 mapping to source channel, zero based mapping.

An AVEncAudioMapDestChannel6 configuration parameters specifies the destination channel 6 mapping to source channel, zero based mapping An AVEncAudioMapDestChannel7 specifies the destination channel 7 mapping to source channel, zero based mapping.

An AVEncAudioInputContent configuration parameter provides a hint to the encoder that the content is either voice or music. This parameter can specify the number of coded channels as follows:

AVEncAudioInputContent_Unknown=0
AVEncAudioInputContent_Voice=1
AVEncAudioInputContent-Music=2

Common Post-Encode Audio Statistical Parameters

An AVEncStatAudioPeakPCMValue configuration parameter specifies the highest volume level occurring in audio content. This value can be obtained upon the completion of encoding.

An AVEncStatAudioAveragePCMValue configuration parameter specifies the average volume level occurring in audio content. This value can be obtained upon the completion of encoding.

An AVEncStatAudioAverageBPS configuration parameter specifies the average bits per second for quality-based VBR audio. This value is also available after encoding.

MPEG Video Encoding Interface: MPV Encoder Specific Parameters

An AVEncMPVGOPSize configuration parameter specifies the maximum distance, in pictures, from one GOP header to the next GOP header.

An AVEncMPVGOPOpen configuration parameter specifies whether the encoder produce closed GOPs. This parameter can specify the following exemplary settings:

0=closed GOP
1=open GOP

An AVEncMPVDefaultBPictureCount configuration parameter specifies the default number of consecutive B pictures to be used between key frames (I/P). The encoder uses this as a hint to the default GOP structure.

An AVEncMPVProfile configuration parameter specifies the profile, e.g., MP. This parameter can specify the following exemplary settings:

eAVEncMPVProfileSimple=1
eAVEncMPVProfileMain=2
eAVEncMPVProfileHigh=3

An AVEncMPVLevel configuration parameter specifies the level, e.g., ML. This parameter can specify the following exemplary settings:

eAVEncMPVLevelLow=1
eAVEncMPVLevehMain=2
eAVEncMPVLevelHigh1440=3
eAVEncMPVLevelHigh=4

An AVEncMPVFrameFieldMode specifies the coding mode of a picture. Specifying field mode will produce an MPEG picture for each source image field. Specifying frame mode will produce a single MPEG picture for each field pair. This parameter can specify the following exemplary settings:

eAVEncMPVFieldFrameType_FieldMode=0
eAVEncMPVFieldFrameType-FrameMode=1

Advanced MPVEncoder Specific Parameters

An AVEncMPVAddSeqEndCode configuration parameter specifies that a sequence end code should be added at the end of the stream. This parameter can specify the following exemplary settings:

0=no sequence end code
1=add sequence end code on

An AVEncMPVGOPSInSeq configuration parameter specifies the number of GOPs between sequence headers.

An AVEncMPVUseConcealmentMotionVectors configuration parameter specifies the use of error concealment motion vectors, namely, 0=off, and 1=on.

An AVEncMPVSceneDetection configuration parameter specifies the way in which scene detection should be handled by the encoder with regard to GOP structures and bit allocation. This parameter can specify the following exemplary settings:
    eAVEncMPVSceneDetectionNone=0
    eAVEncMPVSceneDetectionInsertIPicture=1
    eAVEncMPVSceneDetectionStartNewGOP=2
    eAVEncMPVSceneDetectionStartNewLocatableGOP=3
        (that is, start a new GOP where the first consecutive B pictures do not reference the previous GOP)

An AVEncMPVGenerateHeaderSeqExt configuration parameter specifies that sequence extension headers are generated, namely 0=no header and 1=generate header.

An AVEncMPVGenerateHeaderSeqDispExt configuration parameter specifies that sequence display extension headers are generated, namely 0=no header and 1=generate header.

An AVEncMPVGenerateHeaderPicExt configuration parameter specifies that picture extension headers are generated, namely, 0=no header and 1=generate header.

An AVEncMPVGenerateHeaderPicDispExt configuration parameter specifies that picture display extension headers are generated, namely, 0=no header, 1=generate header.

An AVEncMPVGenerateHeaderSeqScaleExt configuration parameter specifies that sequence scaleable headers are generated, namely 0=no header and 1=generate header.

An AVEncMPVScanPattern configuration parameter specifies the macroblock scan pattern. This parameter can specify the following exemplary settings:
    eAVEncMPVScmAuto=0
    eAVEncMPVScanZigZagScan=1
    eAVEncMPVScanAlternateScan=2

An AVEncMPVIntraDCPrecision configuration parameter specifies the DC Precision in bits (e.g., 8-11 is the usual range). The value "0" indicates that the encoder automatically selects.

An AVEncMPVQScaleType configuration parameter specifies the quantizer scale behavior. This parameter can specify the following exemplary settings:
    eAVEncMPVQScaleTypeAuto=0
    eAVEncMPVQScaleTypeLinear=1
    eAVEncMPVQScaleTypeNonLinear=2

An AVEncMPVIntraVLCTable configuration parameter specifies the use of an alternate VLC table instead of a standard MPEG1 table. This parameter can specify the following exemplary settings:
    eAVEncMPVIntraVLCTableAuto=0
    eAVEncMPVIntraVLCTableMPEG1=1
    eAVEncMPVhitraVLCTableAltenate=2

An AVEncMPVQuantMatrixIntra configuration parameter specifies intra matrix coefficients used by the encoder.

An AVEncMPVQuantMatrixNonIntra configuration parameter specifies non-intra matrix coefficients used by the encoder.

An AVEncMPVQuantMatrixChromaIntra configuration parameter specifies chroma intra matrix coefficients used by the encoder.

An AVEncMPVQuantMatrixChromaNonIntra configuration parameter specifies chroma non-intra matrix coefficients used by the encoder.

MPEG1 Audio Specific Parameters

An AVEncMPALayer configuration parameter specifies the coding layer to be used. This parameter can specify the following exemplary settings:
    eAVEncMPALayer1=1
    eAVEncMPALayer2=2
    eAVEncMPALayer3=3

An AVEncMPACodingMode configuration parameter specifies the coding mode. This parameter can specify the following exemplary settings:
    eAVEncMPACodingModeMono=0
    eAVEncMPACodingModeStereo=1
    eAVEncMPACodingModeDualChannel=2
    eAVEncMPACodingModeJointStereo=3
    eAVEncMPACodingModeSurround=4

Dolby Digital™ Audio Specific Parameters

An AVEncDDService configuration parameter specifies the service provided by the bit stream. This parameter can specify the following exemplary settings:
    eAVEncDDBitStreamCM=0 (Main Service: Complete Main)
    eAVEncDDServiceME=1 (Main Service: Music and Effects (ME))
    eAVEncDDServiceVI=2 (Associated Service: Visually-Impaired (VI))
    eAVEncDDServiceHI=3 (Associated Service: Hearing-Impaired (HI))
    eAVEncDDServiceD=4 (Associated Service: Dialog (D))
    eAVEncDDServiceC=5 (Associated Service: Commentary (C))
    eAVEncDDServiceE=6 (Associated Service: Emergency (E))
    eAVEncDDBitStreamVO=7 (Associated Service: Voice Over (VO)/Karaoke)

An AVEncDDDialogNormalization configuration parameter specifies the dialog normalization level in dB.

An AVEncDDCentreDownMixLevel configuration parameter specifies the center down mix level in dB (e.g., 30 dB, 45 dB, 60 dB)

An AVEncDDSurroundDowrMixLevel configuration parameter specifies the surround down mix level in dB (e.g., 30 dB, 45 dB, 60 dB)

An AVEncDDSurroundMode configuration parameter specifies the surround mode. This parameter can specify the following exemplary settings:
    eAVEncDDSurroundModeNotIndicated=0
    eAVEncDDSurroundModeNo=1
    eAVEncDDSurroundModeYes=2

An AVEncDDProductionInfoExists configuration parameter specifies that the audio production information is present in the stream.

An AVEncDDProductionRoomType configuration parameter specifies the room type in the audio production information. This parameter can specify the following exemplary settings:
    eAVEncDDProductionRoomTypeNotIndicated=0
    eAVEncDDProductionRoomTypeLarge=1
    eAVEncDDProductionRoomTypeSmall=2

An AVEncDDProductionMixLevel configuration parameter specifies the mix level in the audio production information in dB.

An AVEncDDCopyright configuration parameter specifies whether the content is copyrighted.

An AVEncDDOriginalBitstream configuration parameter specifies whether the content is copied or original.

An AVEncDDDigitalDeemphasis configuration parameter enables digital de-emphasis.

An AVEncDDDCHighPassFilter configuration parameter enables high pass filtering for DC removal.

An AVEncDDChannelBWLowpassFilter configuration parameter enables low pass filtering on each channel with an automatically specified bandwidth.

An AVEncDDLFELowpassFilter configuration parameter enables 120 Hz low-pass filtering on the LFE input channel.

An AVEncDDSurround90DegreeePhaseShift configuration parameter specifies a 90 degree phase shift on the surround input channels.

An AVEncDDSurround3dBAttenuation configuration parameter specifies a 3 dB attenuation on the surround input channels.

An AVEncDDDynamicRangeCompressionControl configuration parameter specifies a dynamic range compression profile applied to the input channels. This parameter can specify the following exemplary settings:
eAVEncDDDynRangeCompNone=0
eAVEncDDDynRangeCompFilmStandard=1
eAVEncDDDynRangeCompFilmLight=2
eAVEncDDDynRangeCompMusicStandard=3
eAVEncDDDynRangeCompMusicLight=4

An AVEncDDRFPreEmphasisFilter configuration parameter enables a RF pre-emphasis filter.

An AVEncDDSurroundExMode configuration parameter specifies the Ex surround coding mode. This parameter can specify the following exemplary settings:
eAVEncDDSurroundExModeNotIndicated=0
eAVEncDDSurroundExModeNo=1
eAVEncDDSurroundExModeYes=2

An AVEncDDPreferredStereoDownMixMode configuration parameter specifies the preferred stereo down mix mode. This parameter can specify the following exemplary settings:
eAVEncDDPrefStereoDownMixModeLtRt=0
eAVEncDDPreftereoDowneixModeLoRo=1

An AVEncDDLtRtCenterMixLv1_x10 configuration parameter specifies the LtRt center mix level (x10), e.g., one of 15, 0, −15, −30, −45, −50, −999.

An AVEncDDLtRtSurroundMixLv1_x10 configuration parameter specifies the LtRt surround mix level (x10), e.g., one of 15, 0, −15, −30, −45, −50, −999.

An AVEncDDLoRoCenterMixLv1_x10 configuration parameter specifies the LoRo center mix level (x10), e.g., one of 15, 0, −15, −30, −45, −50, −999.

An AVEncDDLoRoSurroundMixLv1_x10 configuration parameter specifies the LoRo surround mix level (x10), e.g., one of 15, 0, −15, −30, −45, −50, −999.

An AVEncDDAtoDConverterType configuration parameter specifies the AD Converter type used to create source content (if not present in the stream). This parameter can specify the following exemplary settings:
eAVEncDDADConverterTypeStandard=0
eAVEncDDADConverterTypeHDCD=1

An AVEncDDHeadphoneMode configuration parameter specifies the headphone mode. This function can specify the following exemplary settings:
eAVEncDDHeadphoneModeNotIndicated=0
eAVEncDDHeadphoneModeNotEncoded=1
eAVEncDDHeadphoneModeEncoded=2

WMV Video Specific Parameters

An AVEncWMVKeyFrameDistance configuration parameter specifies maximum time, in milliseconds, between key frames in the codec output. The internal logic of the codec determines the actual location of each key frame. The distance between any two key frames may be less than the value of this property; however, it should never be greater.

An AVEncWMVInterlacedEncoding configuration parameter indicates whether interlaced video encoding will be used (e.g., 0=off and 1=on).

An AVEncWMVDecoderComplexity configuration parameter specifies the device conformance template that is desired for use in video encoding.

An AVEncWMVHasKeyFrameBufferLevelMarker configuration parameter specifies whether the encoded video bit stream contains a buffer fullness value with every key frame (e.g., 0=off and 1=insert marker)

An AVEncWMVProduceDummyFrames configuration parameter indicates whether the encoder produces dummy frame entries in the bit stream for duplicate frames. If this value is 0, the media processing functionality will not put any data in the bit stream for duplicate frames.

WMV Post-Encode Statistical Parameters

An AVEncStatWMVCBAvg configuration parameter specifies the resulting buffer window, in milliseconds, of a constrained variable-bit-rate (VBR) stream at its average bit rate.

An AVEncStatWMVCBMax configuration parameter specifies the resulting buffer window, in milliseconds, of a constrained variable-bit-rate (VBR) stream at its peak bit rate.

An AVEncStatWMVDecoderComplexityProfile configuration parameter specifies a device conformance template to which the encoded content conforms. This value can be obtained upon the completion of encoding.

An AVEncStatMPVSkippedEmptyFrames configuration parameter indicates the number of skipped empty frame entries in the bit stream for duplicate frames.

MPEG1/2 Packetizer Interface Parameters

A subset of the common parameter IDs defined earlier also apply to the packetizer function. These are: AVEncCommonTargetApplication; AVEncCommonRealTime; and AVEncCommonPerformance. The following parameters IDs are specific to the packetizer function.

An AVEncMP12MuxEarliestPTS configuration parameter comprises a constraint parameter from the multiplexer that specifies the earliest presentation time of the first access unit in the stream.

An AVEncMP12MuxLargestPacketSize configuration parameter comprises a constraint parameter from the multiplexer that specifies the largest packet size of the PES stream.

An AVEncMP12MuxSysSTDBufferBound configuration parameter comprises a constraint parameter from the multiplexer that specifies the buffer size bound in bytes.

An AVEncMP12PktzSTDBuffer configuration parameter specifies the size of the STD buffer(BSn) in bits (where AVEncMP12PktzSTDBuffer≦AVEncMP12MuxSys STDBufferBound).

An AVEncMP12PktzStreamID configuration parameter specifies the stream ID of the elementary source. Stream IDs may be restricted in range by MPEG specifications and DVD specifications.

An AVEncMP12PktzInitialPTS configuration parameter specifies the presentation time of the first access unit in the stream (where AVEncMP12PktzInitialPTS≧AVEncMP12MuxEarliestPTS).

An AVEncMP12PktzPacketSize configuration parameter specifies the size of the packet in bytes (where AVEncMP12PktzPacketSize≦AVEncMP12MuxLargest PacketSize).

An AVEncMP12PktzCopyright configuration parameter specifies that the payload is copyright protected.

An AVEncMP12PktzOriginal configuration parameter specifies that the payload is original, that is, not copied, MPEG1/2 Multiplexer Interface Parameters A subset of the common parameter IDs defined earlier also apply to the multiplexer function. These are: AVEncCommonTargetApplication; AVEncCommonRealTime; and AVEncCommonPerformance. The following exemplary parameter IDs are specific to the multiplexer function.

An AVEncMP12MuxPacketOverhead configuration parameter specifies the average packet overhead in the stream An AVEncMP12MuxNumStreams configuration parameter specifies the number of streams.

An AVEncMP12MuxEarliestPTS comprises a read only parameter that specifies the earliest presentation time of the first access unit in the stream.

An AVEncMP12MuxLargestPacketSize comprises a read only parameter that specifies the largest packet size of the PES stream.

An AVEncMP12MuxInitialSCR configuration parameter specifies the initial SCR in the multiplex:

An AVEncMP12MuxMuxRate configuration parameter specifies the multiplex rate of the overall stream in bits per second.

An AVEncMP12MuxPackSize configuration parameter specifies the pack size of the multiplex in bytes.

An AVEncMP12MuxSysSTDBufferBound configuration parameter specifies the buffer size bound in bytes.

An AVEncMP12MuxSysRateBound configuration parameter specifies a maximum rate of any mux rate in the multiplex.

An AVEncMP12MuxTargetPacketizer configuration parameter specifies the pin index of the internal packetizer to select for control. This parameter should be set before adjusting packetizer parameters.

An AVEncMP12MuxSysFixed configuration parameter specifies that fixed bit rate is in operation and controls the way SCR increases over time. This parameter implies padding.

An AVEncMP12MuxSysCSPS configuration parameter specifies that the output stream is a constrained system parameter stream.

An AVEncMP12MuxSysVideoLock configuration parameter indicates that there is a specified, constant rational relationship between the video sampling rate and the system clock.

An AVEncMP12MuxSysAudioLock configuration parameter indicates that there is a specified, constant rational relationship between the audio sampling rate and system clock.

An AVEncMP12MuxDVDNavPac configuration parameter indicates that the multiplexer should generate the private DVD navigation packet stream. The multiplexer should attempt to fill in as much data as is reliably possible.

Exemplary Order for Setting Parameters

The interdependencies between the parameters require that master parameters be set before their respective dependent child parameters. Setting up parameters in the correct order ensures that the application 102 will not become locked out of certain parameter combinations due to master/slave relationships. This requirement can be met by dividing the parameters into functional groups, and then setting the parameters based on their membership in the functional groups.

Consider, for example, the case of the MPEG video encoder parameters. The following listing identifies an exemplary order in which these parameters can be set. Other orderings are possible, this being merely one possible example.

System Level Parameters
AVEncCommonIDRealTime
General (minimal controls for starting an encode)
AVEncCommonIDTargetApplication
AVEncMPVIDMPEGType
AVEncMPVIDProfile
AVEncMPVIDLevel
AVEncCommonRateControlMode
AVEncCommonIDPerformance
AVEncCommonIDMeanBitRate
AVEncVideoIDNoOfFieldsToEncode
Key Video Controls
AVEncVideoIDSourceScanType
AVEncVideoIDDisplayFrameRate
AVEncVideoIDEncodeDimension
AVEncVideoIDSampleAspectRatio
Key Coding Controls
AVEncMPVIDLowDelay
AVEncMPVIDBPictures
AVEncMPVIDGOPOpen
AVEncMPVIDGOPSize
AVEncMPVIDFrameField
Advanced Video: Video Input
AVEncVideoIDEncodeOffsetTopLeft
AVEncMPVIIDBwSrc
AVEncVideoIDFieldSwap
Advanced Video: Video Display
AVEncVideoIDDisplayDimension
AVEncMPVIDVideoFormat
Advanced Video: Film Content Control
AVEncVideoIDFilmInverseTelecine
AVEncVideoIDFilmContent
AVEncVideoDInternalTelecineThreshold
Advanced Coding (Advanced Controls): Bitrate/Quality Control
AVEncCommonIDMaxBitRate
AVEncCommonIDMinitRate
AVEncCommonIDDQuality
AVEncVideoIDCodedVideoAccessUnitSize AVEnc-MPVIIDVBVBufferSize
AVEncMPVIIDVBVBufferInLevel
AVEncMTVIDVBVBufferOutLevel
Advanced Coding (Advanced Controls): Sequence Level Control
AVEncMPVIIDPicsInSeq
AVEncMPVBDProgressiveSequence
AVEncMPVIIDAddSeqEndCode
AVEncMPVIIDChromaFormat
AVEncMPVIIDColor Primaries
AVEncMPVIDTransferCharacteristics
AVEncMPVIDMatrixCoefficients
AVEncMPVIDGenerateHeaderSeqExt
AVEncMPVIDGenerateHeaderSeqDispExt
AVEncMPVIDGenerateHeaderPicExt
AVEncMPVIDGenerateHeaderPicDispExt
AVEncMPVBDGenerateHeaderSeqScaleExt
Advanced Coding (Advanced Controls): GOP Level Control
AVEncMPVIDGOPDropFrame
AVEncMPVIDGOPHours
AVEncMPVIDGOPMinutes
AVEncMPVIDGOPSeconds
AVEncMPVIDGOPFrames
AVEncMPVIDSceneDetection
Advanced Coding (Advanced Controls): Picture Level Control
AVEncMPVIDIntraDCPrecision
AVEncMPVIDQScaleType
AVEncMPVIDIntraVLC
AVEncMPVIDScanType
AVEncMPVIDConcealmentMotionVectors
AVEncMPVIDTFF
System Level Parameters
AVEncCommonIDGuaranteeAllInputPUsCoded
AVEncVideoIDStatisticSceneDetected
AVEncMPVIDSeqHdrBitRate
AVEncMPVIDRFF
AVEncMPVIDStatisticSeqHdr
AVEncMPVIDStatisticSeqHdrExt
AVEncMPVIDStatisticSeqHdrScaleExt
AVEncMPVIDStatisticSeqHdrDispExt
AVEncMPVIDStatisticPicHdr AVEncMPVIDStatisticPicHdrExt
AVEncMPVIDStatisticPicHdrDispExt
AVEncMPVIDStatisticGOPHdr
AVEncMPVIDStatisticSliceHdr
Transactions In one exemplary implementation, groups of settings can be atomically set en bloc as respective groups. This can be accomplished by defining a property "eAV_Transaction." A component can advertise its support for transactions by supporting the property.

Mapping WMV/WMA Parameters

As a final topic, the following provides an exemplary list of mappings from WMV/A parameters to the parameters defined above:

Bit Rate Control
AVEncCommonRateControlMode={g_wsz
   WMVCVBREnabled}
AVEncCommonMeanBitRate={g_wszWMVCAvgBitrate}
AVEncCommonMaxBitRate={g_wszWMVCMaxBitrate}
Buffer Control
AVEncWMVKeyFrameBufferLevelMarker={g_wsz
   WMVCBufferFullnessInFirstByte}
AVEncCommonBufferSize={gAwszWMVCVideo Window,g_wszWMACVoiceBuffer}
Encoding Effort and Quality Control
AVEncCommonQualityVsSpeed
   {g=wszWMVCComplexityEx,
AVEncVideoCBRMotionTradeoff={g_wszWMVCCrisp}
AVEncCommonQuality={g_wszWMVCVBRQuality}
Conformance
AVEncWMVDecoderComplexity={g_wszWMVC
   DecoderComplexityRequested}
Multi Pass Control
AVEncCommonPassSelector={func(g_wszWMVCEndOfPass)}
AVEncCommonMultipass={g_wszWMVCPassesUsed}
Direct Coding Controls
AVEncWMVInterlacedCoding={g_wszWMV Chiter-lacedCodingEnabled}
AVEncVideoKeyFrameDistance={g_wszWMVC KeyframeDistance}
AVEncWMVProduceDummyFrames={g_wszWMVC
   ProduceDummyFrames}
Post-Encode Information
AVEncStatVideoOutputFrameRate={g_wszWMVCAvg
   FrameRate}
AVEncStatVideoCodedFrames={g_wszWMVCCoded
   Frames}
AVEncStatVideoTotalFrames={g_wszWMVCTotalFrames}
AVEncStatVideoSkippedEmptyFrames={g_wszWMVC-
   ZeroByteFrames}
AVEncStatWMVCBAvg={g_wszWMVCBAvg}
AVEncStatWMVCBMax={g_wszWMVCBMax}
AVEncStatWMVDecoderComplexityProfile={g_wsz
   WMVCDecoderComplexityProfile}
Audio Control
AVEncWMAIncludeNumPasses={g_wszWMACInclude
   NumPasses}
AVEncAudioInputContent={g_wszWMACMusicSpeech
   ClassMode}
AVEncWMAOrignalWaveFormat={g_wszWMAC OriginalWaveFormat}
AVEncWMAOriginalSourceFormat={g_wszWMAC
   SourceFormatTag}
g_wszWMACVoiceEDL=handled through MF infrastructure
Post-Encode Audio Statistics
AVEncStatAudioAveragePCMValue={g_wszWMAC
   AvgPCMValue,g_wszWMADRCAverageReference}
AVEncStatAudioPeakPCMValue={g_wszWMACAvg
   PCMValue,g_wszWMADRCPeakReference}

F. Appendix 2: Exemplary codecapi.h Module

The following provides an exemplary program listing of a codecapi.h module that can be used to implement aspects of the features described above.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limited set of problems in the Background section does not limit the application of invention to solving only those problems; it can be applied to problems and environments not expressly identified herein. Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for building media processing functionality, comprising:
   identifying, by a computing device, a task to be performed by the computing device;
   identifying, by the computing device, at least one profile that provides predetermined information used to implement the task;
   establishing, by the computing device, at least one component of the computing device to perform the task using:
      the at least one profile;
      capability information which describes capabilities of a pool of available components, wherein the pool of available components are stored in the computing device, the at least one component being established by identifying available components that have capabilities that expressly match the predetermined information and when there is no express match, re-examining the pool of available components that are stored in the computing device to identify any available component that includes at least a portion of the predetermined information such that the task can be implemented by the computing device; and
      a hierarchical organization of configuration parameters; and
   building, by the computing device, the media processing functionality in a defined order based on the established at least one component.

2. The method of claim 1, wherein the at least one component includes one or more of:
   a component implemented by machine-readable instructions; a component implemented by hardware; or a component implemented by a combination of machine-readable instructions and hardware.

3. The method of claim 1, wherein the at least one component includes at least one of the following types of components:
   a video encoder; an audio encoder; a packet-forming component; or a multiplexing component.

4. The method of claim 3, wherein the at least one component includes a set of components comprising at least one member from each of the types of components.

5. The method of claim 1, wherein the establishing of the at least one component comprises:
   creating the at least one component;
   configuring the at least one component; and
   logically associating the at least one component with at least one downstream component.

6. The method of claim 1, wherein the building in the defined order comprises:
   establishing at least one multiplexing component;
   establishing at least one packet-forming component per multiplexer input stream; and
   establishing at least one media encoder.

7. The method of claim 1, wherein the at least one component is a logical sub-division of a larger, more complex component.

8. The method of claim 1, wherein the capability information contains configuration values or ranges of values to be used in the selection of compatible components.

9. The method of claim 1, wherein the hierarchical organization of configuration parameters includes at least one node that specifies configuration parameters that apply to two or more different kinds of components.

10. The method of claim 1, wherein the hierarchical organization of configuration parameters includes at least one node that specifies configuration parameters that apply to two or more different coding paradigms.

11. The method of claim 1, wherein the hierarchical organization of configuration parameters includes:
   a first level which specifies configuration parameters that apply to an entire pool of components;
   a second level, which depends from the first level, which specifies groups of configuration parameters that apply to different respective classes of components within the pool of components; and
   a third level, which depends from the second level, which specifies groups of configuration parameters that apply to different respective general coding paradigms used within the pool of components.

12. The method of claim 11, further comprising a fourth level, which depends from the third level, which specifies groups of configuration parameters that apply to different respective species of the general coding paradigms identified in the third level.

13. The method of claim 1, further including extending the hierarchical organization of parameters to include at least one new node, or to remove at least one existing node in the organization.

14. The method of claim 1, wherein a first application uses a more detailed level of the hierarchical organization of parameters compared to a second application.

15. One or more machine-readable media containing machine readable instructions for implementing the method of claim 1.

16. A method for building media processing functionality, comprising:
   identifying, by a computing device, a task to be performed;
   identifying a plurality of components from a pool of available components that are stored in the computing device by determining whether each of the available components have capabilities that match predetermined information used to perform the task, the capabilities of each of the available components stored in the computing device being re-examined when there is no match;
   establishing, by the computing device, the plurality of components that are stored in the computing device to perform the task using a hierarchical organization of configuration parameters;
   building, by the computing device, the media processing functionality in a defined back-to-front order based on the established plurality of components, the back-to-front order establishing at least one downstream component prior to another component which is upstream relative to the at least one downstream component; and
   monitoring a performance of the established plurality of components stored in the computing device to collect statistical information relating to the performance.

17. The method of claim 16, wherein the building in the defined back-to-front order comprises:
   first, establishing at least one multiplexing component;
   second, establishing at least one packet-forming component per multiplexer input stream; and
   third, establishing at least one media encoder.

18. One or more machine-readable media containing machine readable instructions for implementing the method of claim 16.

19. An apparatus for building media processing functionality, comprising:
   a processor; and
   a memory, communicatively coupled to the processor, for storing:
      a profile store for storing a plurality of profiles, wherein each profile provides predetermined information used to implement a task;
      a pool of available components;
      a capability store for storing capability information which describes the capabilities of the pool of available components stored in the memory; and
      interface functionality for:
         establishing at least one component stored in the memory to perform an identified task by matching the predetermined information associated with the task to the capability information for each available component, the capability information of the pool of available components being re-examined when no express match exists between the predetermined information and the capability information for any available component, the establishing including locating at least one profile in the profile store that is determined to be associated with identified task, the at least one located profile describing how to create and configure the at least one component that is to perform the identified task, the interface functionality using:
            the at least one located profile associated with the identified task, stored in the profile store;
            the capability information, stored in the capability store; and
            a hierarchical organization of configuration parameters,
         wherein the interface functionality is also configured to build the media processing functionality in a defined order based on the established at least one component;
         collecting performance data of the established at least one component stored in the memory by registering one or more events during operation of the established at least one component; and improving a performance of the established at least one component based at least in part on the performance data.

20. The apparatus of claim 19, wherein the hierarchical organization of configuration parameters comprises:

a first data field level which specifies configuration parameters that apply to each component of a pool of components, regardless of coding paradigm;

a second data field level, which depends from the first data field level, which specifies groups of configuration parameters that apply to each video encoder included in the pool of components, regardless of coding paradigm;

a third data field level, which depends from the second data field level, which specifies groups of configuration parameters that apply to each audio encoder included in the pool of components, regardless of coding paradigm; and a fourth data field level, which depends from the third data field level, which specifies groups of configuration parameters that apply to each packetizer or multiplexer included in the pool of components, regardless of coding paradigm.

* * * * *